(12) United States Patent
Yu et al.

(10) Patent No.: US 10,917,638 B2
(45) Date of Patent: Feb. 9, 2021

(54) PICTURE ENCODING/DECODING METHOD AND RELATED APPARATUS

(71) Applicant: HUAWEI TECHNOLOGIES CO., LTD., Guangdong (CN)

(72) Inventors: Lu Yu, Hangzhou (CN); Xuguang Zuo, Hangzhou (CN); Yin Zhao, Hangzhou (CN); Haitao Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 116 days.

(21) Appl. No.: 15/711,555

(22) Filed: Sep. 21, 2017

(65) Prior Publication Data
US 2018/0014012 A1 Jan. 11, 2018

Related U.S. Application Data

(63) Continuation of application No. PCT/CN2016/077396, filed on Mar. 25, 2016.

(30) Foreign Application Priority Data

Mar. 31, 2015 (CN) .......................... 2015 1 0150090

(51) Int. Cl.
*H04N 19/105* (2014.01)
*H04N 19/503* (2014.01)
(Continued)

(52) U.S. Cl.
CPC ......... *H04N 19/105* (2014.11); *H04N 19/142* (2014.11); *H04N 19/159* (2014.11);
(Continued)

(58) Field of Classification Search
CPC .. H04N 19/105; H04N 19/159; H04N 19/172; H04N 19/184; H04N 19/58;
(Continued)

(56) References Cited

U.S. PATENT DOCUMENTS

2012/0002725 A1 1/2012 Kazui
2013/0215956 A1 8/2013 Grembler et al.
(Continued)

FOREIGN PATENT DOCUMENTS

CN 101389034 A 3/2009
CN 101534112 A 9/2009
(Continued)

OTHER PUBLICATIONS

Jyunichi Touchi, "New Illustrated Artificial Intelligence Guide", First edition, Nippon Science and Engineering Publishing Co., Ltd., Feb. 20, 2010, pp. 14 to 15.
(Continued)

*Primary Examiner* — Allen C Wong
(74) *Attorney, Agent, or Firm* — Gregg L. Jansen

(57) ABSTRACT

A picture encoding/decoding method and a related apparatus are provided. The picture decoding method includes obtaining a current picture; selecting, from a knowledge base, K reference pictures of the current picture, where at least one picture in the knowledge base does not belong to a random access segment in which the current picture is located and wherein K is an integer greater than or equal to 1; and decoding the current picture according to the K reference pictures.

36 Claims, 11 Drawing Sheets

(51) Int. Cl.
| | |
|---|---|
| *H04N 19/142* | (2014.01) |
| *H04N 19/172* | (2014.01) |
| *H04N 19/58* | (2014.01) |
| *H04N 19/159* | (2014.01) |
| *H04N 19/184* | (2014.01) |
| *H04N 19/23* | (2014.01) |
| *H04N 19/87* | (2014.01) |
| *G06K 9/00* | (2006.01) |
| *G06K 9/46* | (2006.01) |

(52) U.S. Cl.
CPC ......... *H04N 19/172* (2014.11); *H04N 19/184* (2014.11); *H04N 19/503* (2014.11); *H04N 19/58* (2014.11); *G06K 9/00744* (2013.01); *G06K 9/4671* (2013.01); *H04N 19/23* (2014.11); *H04N 19/87* (2014.11)

(58) Field of Classification Search
CPC .... H04N 19/142; H04N 19/503; H04N 19/23; H04N 19/87; G06K 9/00744; G06K 9/4671
USPC ..................................... 375/240.12
See application file for complete search history.

(56) References Cited

U.S. PATENT DOCUMENTS

| | | | |
|---|---|---|---|
| 2013/0223813 A1 | 8/2013 | Kunigita et al. | |
| 2013/0279599 A1 | 10/2013 | Wang | |
| 2014/0003799 A1* | 1/2014 | Soroushian | H04N 19/46 386/353 |
| 2014/0086328 A1 | 3/2014 | Chen et al. | |
| 2014/0086557 A1* | 3/2014 | Yu | H04N 21/4325 386/241 |
| 2015/0092076 A1* | 4/2015 | Campbell | H04N 19/186 348/222.1 |
| 2015/0103921 A1* | 4/2015 | Hannuksela | H04N 19/152 375/240.26 |
| 2015/0156487 A1* | 6/2015 | Tao | H04N 19/577 375/240.02 |
| 2015/0237377 A1* | 8/2015 | Hendry | H04N 19/50 375/240.25 |
| 2015/0264384 A1 | 9/2015 | Choi et al. | |

FOREIGN PATENT DOCUMENTS

| | | |
|---|---|---|
| CN | 101729898 A | 6/2010 |
| CN | 104247430 A | 12/2014 |
| CN | 104768011 A | 7/2015 |
| EP | 2202987 A2 | 6/2010 |
| JP | 2010004434 A | 1/2010 |
| JP | 2012085216 A | 4/2012 |
| JP | 2013168941 A | 8/2013 |
| WO | 2010106670 A1 | 9/2010 |
| WO | 2014/058210 A1 | 4/2014 |

OTHER PUBLICATIONS

Okubo Ei supervisor, "Impress Standard Textbook Series Revised Third Edition H.264/AVC Textbook", First edition, Jan. 1, 2009, Impress RandD Co., Ltd., 41 pages.

Haruyo Ohkubo et al., "Video CD Authoring System", National Technical Report, vol. 42, No. 5, Matsushita Electric Industrial Co., Ltd., Oct. 18, 1996, pp. 83 to 89.

Wenqing Dai, "Efficient H.264 Video Coding With a Working Memory of Objects", [online], Dec. 22, 2009, University of Missouri-Columbia (Master thesis), 77 Pages.

Edited by the Institute of Image Information and Television Engineers, "Comprehensive Multimedia Selection MPEG", First edition, Apr. 20, 1996, Ohm Co., Ltd., pp. 75 to 79.

SM Shen, et al., "Restricted Multiple Reference Frames with Long Term Frame Buffer", [online], Nov. 30, 2001, ITU Telecommunications Standardization Sector STUDY GROUP 16 Question 6 Video Coding Experts Group (VCEG), Document: VCEG-049, 10 Pages.

Toby Walker, et al., "File Format for JVT Video based on MP4", [online], Jan. 17, 2005, Joint Video Team (JVT) of ISO/IEC MPEG and ITU-T VCEG (ISO/IEC JTC1/SC29/WG11 and ITU-T SG16 Q.6), Document: JVT-C143, 8 Pages.

Okubo Ei supervisor, "Impress Standard Textbook Series H.265/HEVC Textbook", the first version, Oct. 21, 2013, Impress Japan Co., Ltd., pp. 130-135.

Okubo Ei supervisor, "Impress Standard Textbook Series Revised Third Edition H.264/AVC Textbook", First edition, Jan. 1, 2009, Impress RandD Co., Ltd., pp. 311-323.

Saneyasu Ono (two others), "Ubiquitous Technology High Efficiency Conding of Moving Images-MPEG-4 and H.264-", First edition, Ohm Co., Ltd., Apr. 20, 2005, pp. 113-114.

Siwei, MA et al., "Overview of IEEE 1857 video coding standard", 2013 IEEE International Conference on Image Processing, IEEE, Sep. 15, 2013, pp. 1500-1504, XP032965920.

Xianguo, Zhang et al., "An efficient coding scheme for surveillance videos captured by stationary cameras", Visual Communications and Image Processing, Jul. 11, 2010, XP030082230.

Vasconcelos, N. et al., "Library-based coding:a representation for efficient video compression and retrieval", Data Compression Conference, DCC '97, Mar. 25, 1997, pp. 121-130, XP010218726.

Zhang, Xianguo et al., "Background-Modeling-Based Adaptive Prediction for Surveillance Video Coding", IEEE Transactions on Image Processing 23(2):769-84 Feb. 1, 2014, XP011536818.

Zuo, Xuguang et al., "Library based coding for videos with repeated scenes", 2015 Picture Coding Symposium (PCS), IEEE, May 31, 2015, pp. 100-104, XP033184674.

Jun Yu et al., "An efficient method for scene cut detection," Pattern Recognition Letters 22:1379-1391 (2001).

ISO/IEC JTC 1/SC 29, ISO/IEC FDIS 14496-15:2013(E), Information technology—Coding of audio-visual objects—Part 15: Carriage of NAL unit structured video in the ISO Base Media File Format, Apr. 26, 2013. total 117 pages.

* cited by examiner

US 10,917,638 B2

PICTURE ENCODING/DECODING METHOD AND RELATED APPARATUS

CROSS-REFERENCE TO RELATED APPLICATIONS

This application is a continuation of International Application No. PCT/CN2016/077396, filed on Mar. 25, 2016, which claims priority to Chinese Patent Application No. 201510150090.7, filed on Mar. 31, 2015. The disclosures of the aforementioned applications are hereby incorporated by reference in their entireties.

TECHNICAL FIELD

The present disclosure relates to the field of picture processing technologies, and specifically, to a picture encoding method, a picture decoding method, and a related apparatus.

BACKGROUND

During conventional video coding, in order that a coded video supports a random access function, some random access points (random access point) are inserted into the coded video. The video is segmented by using the random access points into multiple video segments supporting the random access function, which may be briefly referred to as random access segments. One random access segment includes one or more pictures (picture). Intra coding (Intra coding) may be performed on a picture in a random access segment, or a picture in a random access segment may be encoded with reference to another picture in the random access segment by means of inter prediction, which is briefly referred to as inter coding (Inter coding).

In a conventional technology, a picture in a random access segment can be used as a reference picture (reference picture/frame) of another picture only in the random access segment. That is, inter prediction (Inter prediction) across random access points is not allowed. This conventional mechanism may relatively greatly limit video coding/decoding efficiency in some scenarios.

SUMMARY

A picture decoding method is provided, comprising obtaining a current picture, selecting, from a knowledge base, K reference pictures of the current picture, wherein at least one picture in the knowledge base does not belong to a random access segment in which the current picture is located and wherein K is an integer greater than or equal to 1, and decoding the current picture according to the K reference pictures.

A picture encoding method is provided, comprising obtaining a current picture, selecting, from a knowledge base, K reference pictures of the current picture, wherein at least one picture in the knowledge base does not belong to a random access segment in which the current picture is located and wherein K is an integer greater than or equal to 1, and encoding the current picture according to the K reference pictures.

A picture decoding apparatus is provided, comprising a memory storage comprising instructions and a processor coupled to the storage. The processor executes the instructions to obtain a current picture, select, from a knowledge base, K reference pictures of the current picture, wherein at least one picture in the knowledge base does not belong to a random access segment in which the current picture is located and wherein K is an integer greater than or equal to 1, and decode the current picture according to the K reference pictures.

A picture encoding apparatus is provided, comprising a memory storage comprising instructions and a processor coupled to the memory storage. The processor is configured to obtain a current picture, select, from a knowledge base, K reference pictures of the current picture, wherein at least one picture in the knowledge base does not belong to a random access segment in which the current picture is located and wherein K is an integer greater than or equal to 1, and encode the current picture according to the K reference pictures.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and persons of ordinary skill in the art may still derive other drawings from these accompanying drawings without creative efforts.

DESCRIPTION OF EMBODIMENTS

Embodiments of the present disclosure provide a picture encoding/decoding method and a related apparatus, so as to improve video coding/decoding efficiency.

In the specification, claims, and accompanying drawings of the present disclosure, the terms "first", "second", "third", "fourth", and so on are intended to distinguish between different objects but do not indicate a particular order. In addition, the terms "including", "including", or any other variant thereof, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Detailed descriptions are separately provided below.

The following first describes some concepts that may be used in the embodiments of the present disclosure.

In most coding frameworks, a video sequence includes a series of pictures (picture). A picture is further divided into slices (slice). A slice is further divided into blocks (block). During video coding, encoding processing may be performed row by row from left to right and from top to bottom in units of block, starting from an upper left corner position of a picture. In some new video coding standards, a concept of "block" is further extended. In the H.264 standard, there is a macroblock (MB). An MB may be further divided into multiple prediction blocks (such as a partition) that can be used for predictive coding. In the HEVC standard, basic concepts such as "coding unit" (CU), "prediction unit" (PU), and "transform unit" (TU) are used. Units are divided into multiple units in terms of functions, and a description is made using a new tree-based structure. For example, a CU may be divided into smaller CUs according to a quadtree, and the smaller CUs may be further divided, so as to form a quadtree structure. There is also a similar tree structure for a PU and a TU. A CU, a PU, and a TU essentially all fall within the concept of "block". A CU is similar to a macroblock MB and is a basic unit for dividing and encoding a to-be-encoded picture. A PU is a basic unit for predictive coding. A CU is further divided into multiple PUs according to a division mode. A TU is a basic unit for transforming a prediction residual. In the High Efficiency Video Coding (HEVC) standard, CUs may be collectively referred to as coding tree unit (CTU), or the like.

Figure 1A:
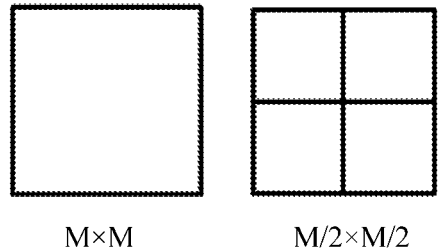
FIG. 1A and FIG. 1B are several schematic diagrams of picture block division according to an embodiment of the present disclosure.
Figure 1B:
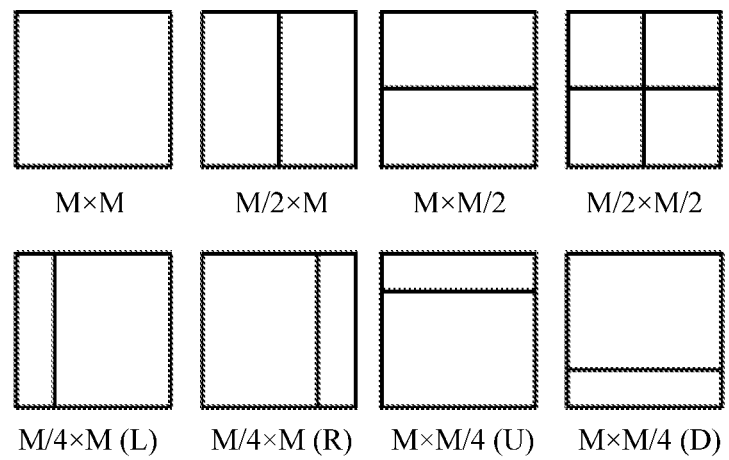

In the HEVC standard, a size of a coding unit may include four levels: 64×64, 32×32, 16×16, and 8×8. Each level of coding unit may be divided into prediction units of different sizes according to intra prediction and inter prediction. For example, as shown in FIG. 1A and FIG. 1B, FIG. 1A exemplifies a prediction unit division manner corresponding to intra prediction, and FIG. 1B exemplifies several prediction unit division manners corresponding to inter prediction.

In an evolution process of a video coding technology, video coding experts propose multiple methods to improve encoding/decoding efficiency as far as possible by using a temporal correlation and a spatial correlation between adjacent to-be-encoded/decoded blocks. In the H.264/Advanced Video Coding (AVC) standard, a skip mode (skip mode) and a direct mode (direct mode) become effective means of improving encoding efficiency. In a case of a low bit rate, blocks for which the two encoding modes are used may occupy more than half of an entire coding sequence. When the skip mode is used, only one skip mode mark needs to be transferred in a bitstream, so that a motion vector of a current picture block may be deduced by using a neighboring motion vector, and a value of a reference block is directly copied as a reconstruction value of the current picture block according to the motion vector. In addition, when the direct mode is used, an encoder may deduce a motion vector of a current picture block by using a neighboring motion vector, and directly copy a value of a reference block as a predicted value of the current picture block according to the motion vector. The encoder performs predictive coding for the current picture block by using the predicted value. Currently, in the latest High Efficiency Video Coding (HEVC) standard, video coding efficiency is further improved by introducing some new encoding means. A merge (merge) coding mode and an advanced motion vector prediction (advanced motion vector prediction, AMVP for short) mode are two important inter prediction means. During merge (merge) coding, motion information (which may include a motion vector (MV), a prediction direction, a reference frame index, and the like) of a neighboring encoded block of a current to-be-encoded block is used to form a candidate motion information set. By comparison, candidate motion information that brings highest encoding efficiency may be selected as motion information of the current to-be-encoded block. A predicted value of the current to-be-encoded block is found from a reference frame, and predictive coding is performed on the current to-be-encoded block. In addition, an index value that indicates to-be-selected motion information of a neighboring encoded block may be written into a bitstream. When the advanced motion vector prediction mode is used, a motion vector of a neighboring encoded block is used as a predicted value of a motion vector of a current to-be-encoded block, a motion vector that brings highest encoding efficiency may be selected to predict a motion vector of the current to-be-encoded block, and an index value that indicates a to-be-selected neighboring motion vector may be written into a video bitstream.

The following first describes a picture encoding method provided in an embodiment of the present disclosure. The picture encoding method provided in this embodiment of the present disclosure is executed by a picture encoding apparatus. The picture encoding apparatus may be any apparatus that needs to output or store a video, for example, a device such as a notebook computer, a tablet computer, a personal computer, a mobile phone, or a video server.

In an embodiment of the picture encoding method of the present disclosure, the picture encoding method may include: obtaining a current picture; selecting, from a knowledge base, K reference pictures of the current picture, where at least one picture in the knowledge base does not belong to a random access segment in which the current picture is located, and K is an integer greater than or equal to 1; and encoding the current picture according to the K reference pictures.

Figure 1C:
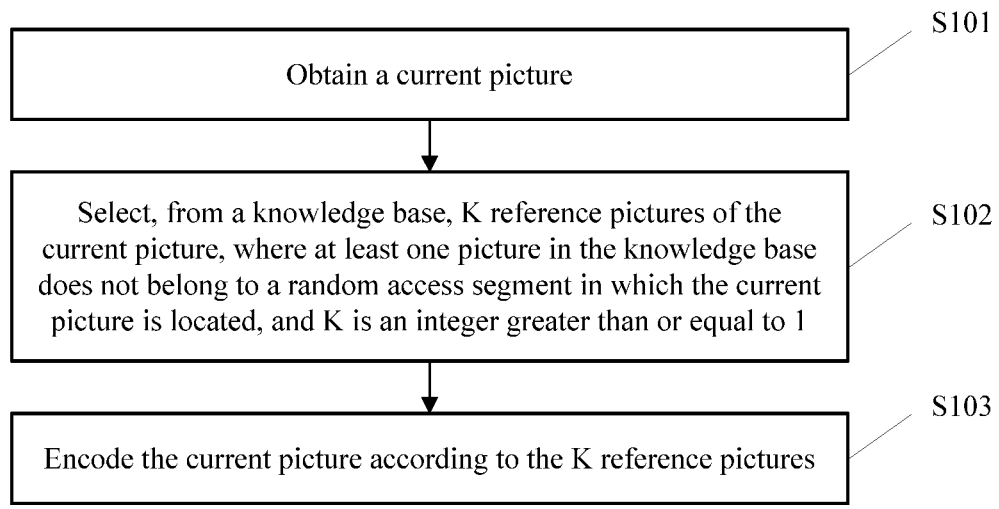
FIG. 1C is a schematic flowchart of a picture encoding method according to an embodiment of the present disclosure.

Referring to FIG. 1C, FIG. 1C is a schematic flowchart of a picture encoding method according to an embodiment of the present disclosure. As shown in FIG. 1C, the picture encoding method provided in this embodiment of the present disclosure may include the following steps.

S101. Obtain a current picture.

S102. Select, from a knowledge base, K reference pictures of the current picture, where at least one picture in the knowledge base does not belong to a random access segment in which the current picture is located, and K is an integer greater than or equal to 1.

The knowledge base may be considered as a picture set that can accommodate candidate reference pictures of the current picture, and some or all pictures in the knowledge base may be selected as reference pictures of the current picture. A picture in the knowledge base may be an original picture, or may be a reconstructed picture.

Because at least one picture in the knowledge base does not belong to the random access segment in which the current picture is located, that is, the at least one picture that does not belong to the random access segment in which the current picture is located may be used as a candidate reference picture of the current picture, a picture that does not belong to the random access segment in which the current picture is located may be selected as a reference picture of the current picture. Therefore, at least one picture in the K reference pictures may not belong to the random access segment in which the current picture is located, and certainly, in some cases, all the K reference pictures may belong to the random access segment in which the current picture is located.

The K reference pictures may be all reference pictures of the current picture, or may be some reference pictures of the current picture.

Optionally, for example, K may be equal to 1, 2, 3, 4, 5, 8, 9, 10, 20, 30, 43, 50, or another positive integer.

In different scenarios, manners of defining the random access segment in which the current picture is located may not be the same. For example, the random access segment in which the current picture is located may include pictures that are arranged in a decoding order from a closest random access point before the current picture to a closest random access point after the current picture at a video layer at which the current picture is located, and the random access segment in which the current picture is located includes a picture at the closest random access point before the current picture, but does not include a picture at the closest random access point after the current picture. Alternatively, if the current picture is located at a dependent layer, the random access segment in which the current picture is located includes pictures that are arranged in a decoding order from a closest random access point before the current picture to a closest random access point after the current picture at a video layer at which the current picture is located, and includes pictures that are arranged in a decoding order from a closest random access point before X reference pictures of the current picture to a closest random access point after the X reference pictures at a video layer at which the X reference pictures are located, the random access segment in which the current picture is located includes a picture at the closest random access point before the current picture, but does not include a picture at the closest random access point after the current picture, the random access segment in which the current picture is located includes a picture at the closest random access point before the X reference pictures, but does not include a picture at the closest random access point after the X reference pictures, and the X reference pictures are reference pictures of the current picture that are at another video layer other than the dependent layer.

X is an integer greater than or equal to 1.

Optionally, for example, X may be equal to 1, 2, 3, 4, 5, 7, 9, 11, 20, 30, 43, 50, or another positive integer.

S103. Encode the current picture according to the K reference pictures.

The encoding the current picture according to the K reference pictures may include: performing prediction for the current picture according to the K reference pictures to obtain a predicted pixel value of the current picture, obtaining a prediction residual of the current picture according to an original pixel value and the predicted pixel value of the current picture, and writing the prediction residual of the current picture into a first video bitstream.

It may be learned that in a picture encoding process of the solution of this embodiment, after a current picture is obtained, K reference pictures of the current picture may be selected from a knowledge base, and the current picture is encoded according to the K reference pictures. Because at least one picture in the knowledge base does not belong to a random access segment in which the current picture is located, that is, the at least one picture that does not belong to the random access segment in which the current picture is located may be used as a candidate reference picture of the current picture, a picture that does not belong to the random access segment in which the current picture is located may be selected as a reference picture of the current picture. To some extent, this breaks a limitation that is imposed by a conventional technology on a reference picture candidate range of the current picture, and this further helps improve video coding efficiency to some extent because the solution expands the reference picture candidate range of the current picture to some extent.

Optionally, in some possible implementations of the present disclosure, the K reference pictures of the current picture may be selected from the knowledge base based on a preset policy. For example, picture features of the K reference pictures match a picture feature of the current picture. That the picture features of the K reference pictures match the picture feature of the current picture may mean that degrees of similarity between the picture features of the K reference pictures and the picture feature of the current picture exceed a specified threshold. For example, the specified threshold may be 0.85, 70%, 81%, 88%, or another value that meets a requirement. For example, the degree of similarity is a linear correlation between two picture feature vectors, or a reciprocal of a largest difference between groups of elements in two picture feature vectors, or a reciprocal of a Hamming distance between two picture feature vectors.

Optionally, in some possible implementations of the present disclosure, for example, the picture feature may include at least one of scale-invariant feature transform (SIFT, Scale-invariant feature transform) of the picture or speeded up robust features (SURF, Speeded Up Robust Features) of the picture, and certainly, may include another picture feature.

The knowledge base may include various pictures. For example, the knowledge base may include a reconstructed picture obtained by performing compression coding on a key picture in a video sequence to which the current picture belongs. The key picture in the video sequence to which the current picture belongs may include at least one of a scene cut (scene cut) picture or a background picture in the video sequence to which the current picture belongs.

The scene cut picture or the background picture may be obtained in multiple manners. For example, the scene cut picture may be obtained by performing scene cut detection on the video sequence to which the current picture belongs, or the background picture is obtained by performing background modeling on the video sequence to which the current picture belongs.

It may be learned that the solution supports the following case: One or more background pictures are selected as reference pictures of the current picture, and a selected background picture may not be a closest background picture before the current picture. It is found from a research and practice process that this mechanism helps more flexibly eliminate redundant information in a video.

Optionally, in some possible implementations of the present disclosure, at least one picture in the knowledge base may be obtained by decoding a second video bitstream, or at least one picture in the knowledge base is obtained by decoding the first video bitstream obtained by encoding the current picture. The first video bitstream and the second video bitstream are different video bitstreams. For example, a number of a picture in the first video bitstream is independent from a number of a picture in the second video bitstream. The number of the picture in the first video bitstream indicates a relative relationship between pictures in a display order. For example, a picture with a relatively small number appears before a picture with a relatively large number in the display order. The number of the picture in the second video bitstream may not indicate a chronological order. Pictures that are respectively in the first video bitstream and the second video bitstream and that have a same number are not necessarily corresponding to a same moment.

Optionally, in some possible implementations of the present disclosure, a reference picture index of the current picture may be written into the first video bitstream. The reference picture index of the current picture may directly or indirectly indicate a reference picture of the current picture. For example, the reference picture index of the current picture may indicate at least one of a number of a reference picture, a picture feature of a reference picture, or a picture feature of the current picture. A decoder side may determine a reference picture of the current picture according to the reference picture index of the current picture.

The following further describes a picture decoding method provided in an embodiment of the present disclosure. The picture decoding method provided in this embodiment of the present disclosure is executed by a picture decoding apparatus. The picture decoding apparatus may be any apparatus that needs to output or store a video, for example, a device such as a notebook computer, a tablet computer, a personal computer, a mobile phone, or a video server.

In an embodiment of the picture decoding method of the present disclosure, the picture decoding method may include: obtaining a current picture; selecting, from a knowledge base, K reference pictures of the current picture, where at least one picture in the knowledge base does not belong to a random access segment in which the current picture is located, and K is an integer greater than or equal to 1; and decoding the current picture according to the K reference pictures.

Figure 2:
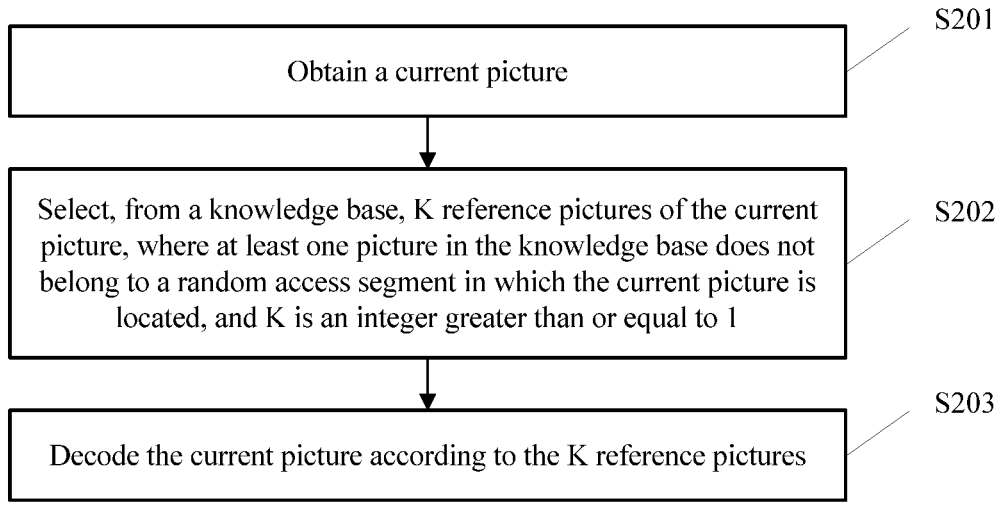
FIG. 2 is a schematic flowchart of a picture decoding method according to an embodiment of the present disclosure.

Referring to FIG. 2, FIG. 2 is a schematic flowchart of a picture decoding method according to another embodiment of the present disclosure. As shown in FIG. 2, the picture decoding method provided in the another embodiment of the present disclosure may include the following steps.

201. Obtain a current picture.

In a picture decoding process, the current picture may be referred to as a current to-be-decoded picture, corresponding to a part of a first video bitstream.

202. Select, from a knowledge base, K reference pictures of the current picture, where at least one picture in the knowledge base does not belong to a random access segment in which the current picture is located, and K is an integer greater than or equal to 1.

The knowledge base may be considered as a picture set that can accommodate candidate reference pictures of the current picture, and some or all pictures in the knowledge base may be selected as reference pictures of the current picture. A picture in the knowledge base may be an original picture, or may be a reconstructed picture. The knowledge base may include at least two pictures.

Because at least one picture in the knowledge base does not belong to the random access segment in which the current picture is located, that is, the at least one picture that does not belong to the random access segment in which the current picture is located may be used as a candidate reference picture of the current picture, a picture that does not belong to the random access segment in which the current picture is located may be selected as a reference picture of the current picture. Therefore, at least one picture in the K reference pictures may not belong to the random access segment in which the current picture is located, and certainly, in some cases, all the K reference pictures may belong to the random access segment in which the current picture is located.

The K reference pictures may be all reference pictures of the current picture, or may be some reference pictures of the current picture.

Optionally, for example, K may be equal to 1, 2, 3, 4, 5, 8, 9, 10, 20, 30, 43, 50, or another positive integer.

In different scenarios, manners of defining the random access segment in which the current picture is located may not be the same. For example, the random access segment in which the current picture is located may include pictures that are arranged in a decoding order from a closest random access point before the current picture to a closest random access point after the current picture at a video layer at which the current picture is located, and the random access segment in which the current picture is located includes a picture at the closest random access point before the current picture, but does not include a picture at the closest random access point after the current picture. Alternatively, if the current picture is located at a dependent layer, the random access segment in which the current picture is located includes pictures that are arranged in a decoding order from a closest random access point before the current picture to a closest random access point after the current picture at a video layer at which the current picture is located, and includes pictures that are arranged in a decoding order from a closest random access point before X reference pictures of the current picture to a closest random access point after the X reference pictures at a video layer at which the X reference pictures are located, the random access segment in which the current picture is located includes a picture at the closest random access point before the current picture, but does not include a picture at the closest random access point after the current picture, the random access segment in which the current picture is located includes a picture at the closest random access point before the X reference pictures, but does not include a picture at the closest random access point after the X reference pictures, and the X reference pictures are reference pictures of the current picture that are at another video layer other than the dependent layer.

It should be noted that if the current picture is located at a random access point, the closest random access point before the current picture is the random access point at which the current picture is located, and if a reference picture that is of the current picture and that is at another video layer is located at a random access point, the closest random access point before the reference picture is the random access point at which the reference picture is located.

In addition, in some encoding structures, for example, in a bitstream obtained by encoding, by using a hierarchical B (Hierarchical B) frame structure, a video sequence in which the current picture is located, the random access segment in which the current picture is located may further include a second closest random access point before the current picture.

X is an integer greater than or equal to 1.

Optionally, for example, X may be equal to 1, 2, 3, 4, 5, 7, 9, 11, 20, 30, 43, 50, or another positive integer.

203. Decode the current picture according to the K reference pictures.

The decoding the current picture according to the K reference pictures may include: performing prediction for the current picture according to the K reference pictures to obtain a predicted pixel value of the current picture, and obtaining a reconstructed picture of the current picture by reconstructing the current picture according to the predicted pixel value and a prediction residual of the current picture.

It may be learned that in a picture decoding process of the solution of this embodiment, after a current picture is obtained, K reference pictures of the current picture may be selected from a knowledge base, and the current picture is decoded according to the K reference pictures. Because at least one picture in the knowledge base does not belong to a random access segment in which the current picture is located, that is, the at least one picture that does not belong to the random access segment in which the current picture is located may be used as a candidate reference picture of the current picture, a picture that does not belong to the random access segment in which the current picture is located may be selected as a reference picture of the current picture. To some extent, this breaks a limitation that is imposed by a conventional technology on a reference picture candidate range of the current picture, and this further helps improve video decoding efficiency to some extent because the solution expands the reference picture candidate range of the current picture to some extent.

Optionally, in some possible implementations of the present disclosure, at least one picture in the knowledge base is obtained by decoding a second video bitstream. Alternatively, at least one picture in the knowledge base may be prestored in a picture decoding apparatus. For example, a knowledge base stored in the picture decoding apparatus may be the same or partially the same as that stored in a picture encoding apparatus, and each of the picture decoding apparatus and the picture encoding apparatus may obtain a reconstructed picture by decoding a second video bitstream, and add the obtained reconstructed picture to the knowledge base maintained by each of the picture decoding apparatus and the picture encoding apparatus.

Optionally, in some possible implementations of the present disclosure, the selecting, from a knowledge base, K reference pictures of the current picture may include: selecting, from the knowledge base, the K reference pictures of the current picture based on a reference picture index that is of the current picture and that is obtained by decoding the first video bitstream to which the current picture belongs.

The reference picture index of the current picture may indicate at least one of a number of a reference picture, a picture feature of a reference picture, or a picture feature of the current picture. For example, if the reference picture index indicates the picture feature of the current picture, picture features of the K reference pictures match the picture feature of the current picture. That the picture features of the K reference pictures match the picture feature of the current picture may mean that degrees of similarity between the picture features of the K reference pictures and the picture feature of the current picture exceed a specified threshold (for example, the threshold may be 0.85, 70%, 85%, 88%, or another value that meets a requirement). For example, the degree of similarity is a linear correlation between two picture feature vectors, or a reciprocal of a largest difference between groups of elements in two picture feature vectors, or a reciprocal of a Hamming distance between two picture feature vectors.

Optionally, in some possible implementations of the present disclosure, for example, the picture feature may include at least one of scale-invariant feature transform (SIFT) of the picture or speeded up robust features (SURF) of the picture, and certainly, may include another picture feature.

Optionally, in some possible implementations of the present disclosure, for example, a reference picture that matches the reference picture index may include a reconstructed picture before the random access segment in which the current picture is located.

Optionally, in some possible implementations of the present disclosure, the method further includes: if no reference picture that matches the reference picture index is found from the second video bitstream, requesting, from a server, an incremental bitstream of the second video bitstream that includes a reference picture that matches the reference picture index, decoding the incremental bitstream of the second video bitstream to obtain the reference picture that matches the reference picture index, and using, as a reference picture of the current picture, the obtained reference picture that matches the reference picture index.

, for example, a reference picture cache may be first searched for a reference picture that matches the reference picture index. If no reference picture that matches the reference picture index is found from the reference picture cache, the second video bitstream may be further searched for a reference picture that matches the reference picture index. If no reference picture that matches the reference picture index is found from the second video bitstream, the incremental bitstream of the second video bitstream that includes a reference picture that matches the reference picture index may be further requested from the server, the incremental bitstream of the second video bitstream is decoded to obtain the reference picture that matches the reference picture index, and the obtained reference picture that matches the reference picture index is used as the reference picture of the current picture.

The knowledge base may include various pictures. For example, the knowledge base may include a reconstructed picture obtained by performing compression coding on a key picture in the video sequence to which the current picture belongs. The key picture in the video sequence to which the current picture belongs may include at least one of a scene cut picture or a background picture in the video sequence to which the current picture belongs.

The scene cut picture or the background picture may be obtained in multiple manners. For example, the scene cut picture is obtained by decoding the second video bitstream or the first video bitstream to which the current picture belongs, or the background picture is obtained by decoding the second video bitstream or the first video bitstream to which the current picture belongs, or the background picture is obtained by performing background modeling on a decoded video sequence in the first video bitstream to which the current picture belongs.

Optionally, in some possible implementations of the present disclosure, at least one picture in the knowledge base may be obtained by decoding the second video bitstream, or at least one picture in the knowledge base is obtained by decoding the first video bitstream obtained by encoding the current picture. The second video bitstream and the first video bitstream are different video bitstreams. For example, a number of a picture in the first video bitstream is independent from a number of a picture in the second video bitstream. The number of the picture in the first video bitstream indicates a relative relationship between pictures in a display order. For example, a picture with a relatively small number appears before a picture with a relatively large number in the display order. The number of the picture in the second video bitstream may not indicate a chronological order. Pictures that are respectively in the first video bitstream and the second video bitstream and that have a same number are not necessarily corresponding to a same moment.

Optionally, in some possible implementations of the present disclosure, the decoding the current picture according to the K reference pictures may include: adding the K reference pictures to a reference picture list (reference picture list) of the current picture, and decoding the current picture according to a reference picture in the reference picture list.

For ease of better understanding and implementation of the foregoing solutions of the embodiments of the present disclosure, the following makes further descriptions by using more specific application scenarios.

Figure 3A:
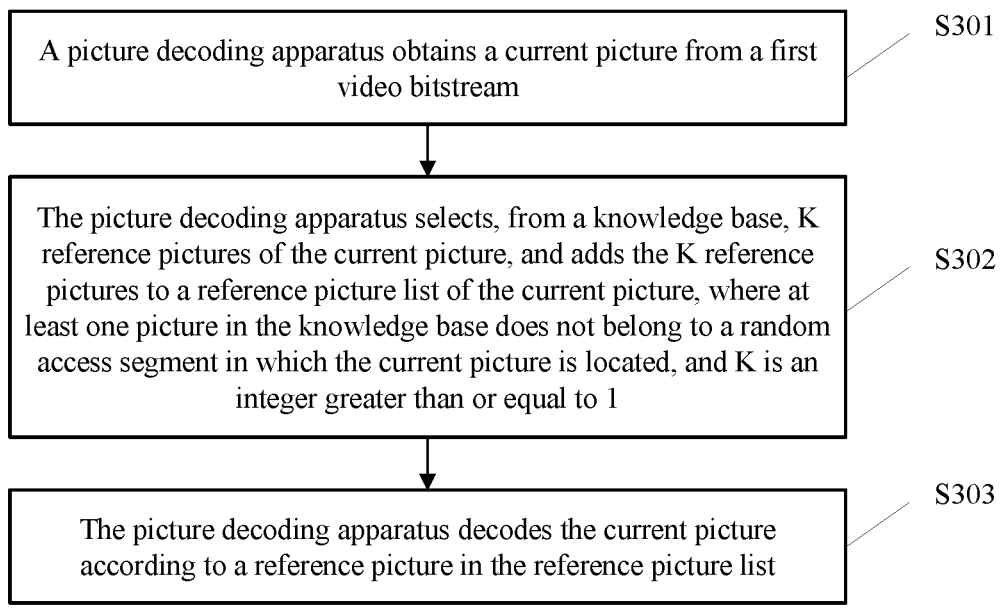
FIG. 3A is a schematic flowchart of a picture decoding method according to an embodiment of the present disclosure.
Figure 3B:
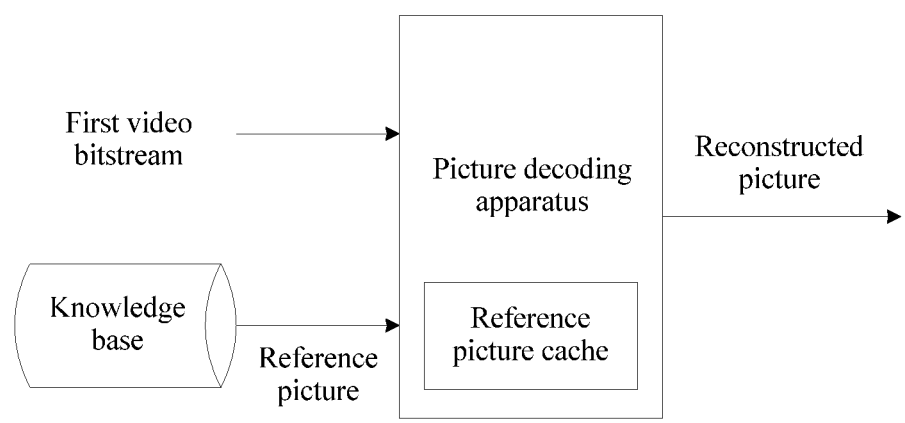
FIG. 3B is a schematic diagram of a picture decoding system architecture according to an embodiment of the present disclosure.

Referring to FIG. 3A and FIG. 3B, FIG. 3A is a schematic flowchart of a picture decoding method according to another embodiment of the present disclosure. The picture decoding method shown in FIG. 3A may be implemented based on a picture decoding system architecture shown in FIG. 3B.

As shown in FIG. 3A, the picture decoding method provided in another embodiment of the present disclosure may include the following steps.

S301. A picture decoding apparatus obtains a current picture from a first video bitstream.

In a picture decoding process, the current picture may be referred to as a current to-be-decoded picture, corresponding to a part of the first video bitstream.

The picture decoding apparatus may include a reference picture cache. The reference picture cache may store a short-term reference picture and a long-term reference picture for prediction for the current to-be-decoded picture.

S302. The picture decoding apparatus selects, from a knowledge base, K reference pictures of the current picture, and adds the K reference pictures to a reference picture list of the current picture, where at least one picture in the knowledge base does not belong to a random access segment in which the current picture is located, and K is an integer greater than or equal to 1.

The knowledge base may be considered as a picture set that can accommodate candidate reference pictures of the current picture, and some or all pictures in the knowledge base may be selected as reference pictures of the current picture. A picture in the knowledge base may be an original picture, or may be a reconstructed picture. The knowledge base may include at least two pictures.

Particularly, pictures in the knowledge base may be pictures prestored in the picture decoding apparatus. The pictures may not be corresponding to pictures in a video sequence in which the current picture is located, for example, may include a picture that includes multiple patterns, or may include a picture rendered by a computer, or may even include a picture that is downloaded from a network and added to the knowledge base, or may include a picture that is copied from a portable storage device into the knowledge base. The knowledge base may be set to a dynamic accumulation state, in which included pictures are continuously updated in quantity and content as time goes by. The pictures may include a picture on which compression coding is not performed, and also include a picture that does not belong to the random access segment in which the current picture is located.

Because at least one picture in the knowledge base does not belong to the random access segment in which the current picture is located, that is, the at least one picture that does not belong to the random access segment in which the current picture is located may be used as a candidate reference picture of the current picture, a picture that does not belong to the random access segment in which the current picture is located may be selected as a reference picture of the current picture. Therefore, at least one picture in the K reference pictures may not belong to the random access segment in which the current picture is located, and certainly, in some cases, all the K reference pictures may belong to the random access segment in which the current picture is located.

In different scenarios, manners of defining the random access segment in which the current picture is located may not be the same. For example, the random access segment in which the current picture is located may include pictures that are arranged in a decoding order from a closest random access point before the current picture to a closest random access point after the current picture at a video layer at which the current picture is located, and the random access segment in which the current picture is located includes a picture at the closest random access point before the current picture, but does not include a picture at the closest random access point after the current picture. Alternatively, if the current picture is located at a dependent layer, the random access segment in which the current picture is located includes pictures that are arranged in a decoding order from a closest random access point before the current picture to a closest random access point after the current picture at a video layer at which the current picture is located, and includes pictures that are arranged in a decoding order from a closest random access point before X reference pictures of the current picture to a closest random access point after the X reference pictures at a video layer at which the X reference pictures are located, the random access segment in which the current picture is located includes a picture at the closest random access point before the current picture, but does not include a picture at the closest random access point after the current picture, the random access segment in which the current picture is located includes a picture at the closest random access point before the X reference pictures, but does not include a picture at the closest random access point after the X reference pictures, and the X reference pictures are reference pictures of the current picture that are at another video layer other than the dependent layer.

Figure 3C:
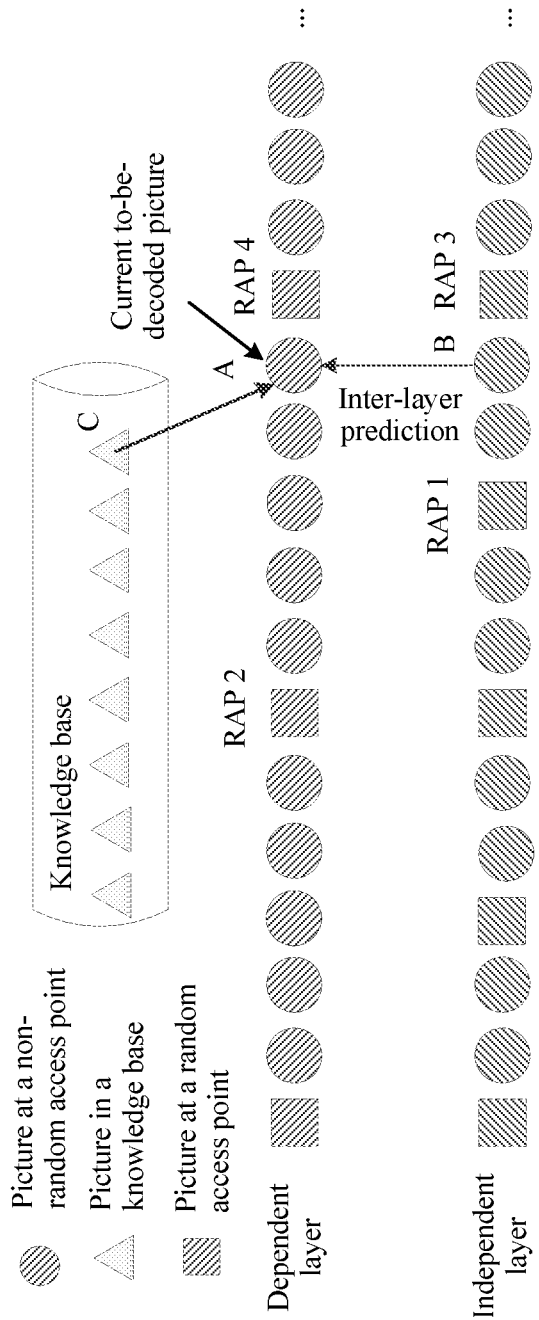
FIG. 3C and FIG. 3D are two schematic diagrams that define a random access segment according to an embodiment of the present disclosure.

For example, referring to FIG. 3C, a picture such as a picture A (a current picture) in FIG. 3C at a dependent layer of a first video bitstream that includes one independent layer and one dependent layer is decoded. A random access segment in which the picture A is located includes pictures that are arranged in a decoding order from a picture at a closest random access point RAP 2 before the picture A to a picture at a closest random access point RAP 4 after the picture A at the dependent layer, and further includes pictures that are arranged in a decoding order from a picture at a closest random access point RAP 1 before a picture B to a picture at a closest random access point RAP 3 after the picture B at the independent layer. The picture B is a reference picture that is of the picture A and that is at the independent layer. The decoding apparatus may select a picture C from the knowledge base as a reference picture of the picture A, add the picture C to a reference picture list of the picture A, and decode the picture A. The picture C does not belong to the random access segment in which the picture A is located.

Figure 3D:
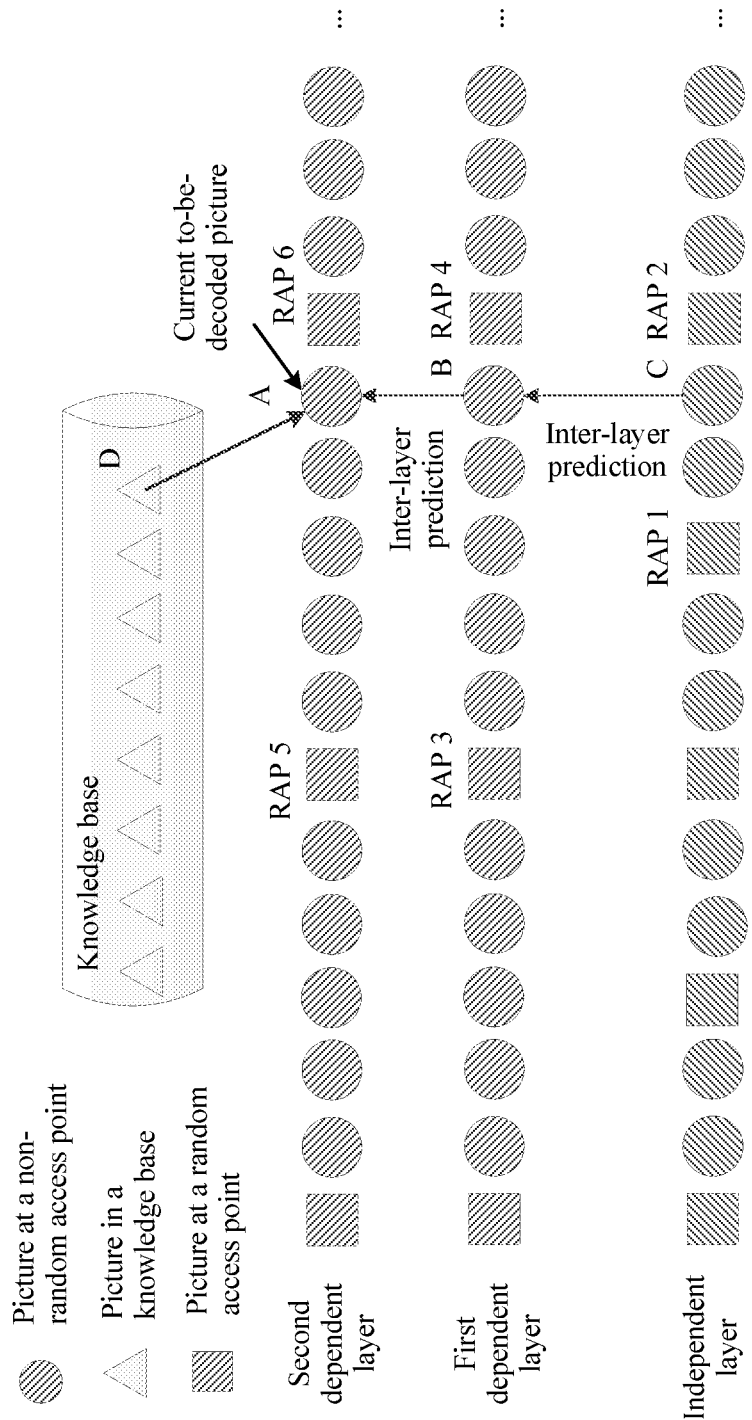

For another example, referring to FIG. 3D, a picture such as a picture A (a current picture) in FIG. 3D at a second dependent layer of a video bitstream that includes one independent layer and two dependent layers is decoded. A random access segment in which the picture A is located includes pictures that are arranged in a decoding order from a picture at a closest random access point RAP 5 before the picture A to a picture at a closest random access point RAP 6 after the picture A at the second dependent layer, includes pictures that are arranged in a decoding order from a picture at a closest random access point RAP 3 before a picture B to a picture at a closest random access point RAP 4 after the picture B at a first dependent layer, and further includes pictures that are arranged in a decoding order from a picture at a closest random access point RAP 1 before a picture C to a picture at a closest random access point RAP 2 after the picture C at the independent layer. The picture B is a reference picture that is of the picture A and that is at the first dependent layer. The picture C is a reference picture that is of the picture B and that is at the independent layer. The decoding apparatus selects a picture D from the knowledge base as a reference picture of the picture A, and the picture D does not belong to the random access segment in which the picture A is located. Other cases are deduced from this.

It should be noted that if the current picture is located at a random access point, the closest random access point before the current picture is the random access point at which the current picture is located, and if a reference picture that is of the current picture and that is at another video layer is located at a random access point, the closest random access point before the reference picture is the random access point at which the reference picture is located.

In addition, in some encoding structures, for example, in a bitstream obtained by encoding, by using a hierarchical B (Hierarchical B) frame structure, the video sequence in which the current picture is located, the random access segment in which the current picture is located may further include a second closest random access point before the current picture.

Optionally, in some possible implementations of the present disclosure, the selecting, from a knowledge base, K reference pictures of the current picture may include: selecting, from the knowledge base, the K reference pictures of the current picture based on a reference picture index that is of the current picture and that is obtained by decoding the first video bitstream to which the current picture belongs.

The reference picture index of the current picture may indicate at least one of a number of a reference picture, a picture feature of a reference picture, or a picture feature of the current picture. For example, if the reference picture index indicates the picture feature of the current picture, picture features of the K reference pictures match the picture feature of the current picture. That the picture features of the K reference pictures match the picture feature of the current picture may mean that degrees of similarity between the picture features of the K reference pictures and the picture feature of the current picture exceed a specified threshold (for example, the threshold may be 70%, 85%, 88%, or another value that meets a requirement). Alternatively, the degrees of similarity between the picture features of the K reference pictures and the picture feature of the current picture may be greater than or equal to a degree of similarity between the picture feature of the current picture and a picture feature of another picture in the knowledge base.

Optionally, in some possible implementations of the present disclosure, for example, the picture feature may include at least one of scale-invariant feature transform (SIFT) of the picture or speeded up robust features (SURF) of the picture, and certainly, may include another picture feature.

S303. The picture decoding apparatus decodes the current picture according to a reference picture in the reference picture list.

That the picture decoding apparatus decodes the current picture according to a reference picture in the reference picture list may include: performing prediction for the current picture according to the K reference pictures to obtain a predicted pixel value of the current picture, and obtaining a reconstructed picture of the current picture by reconstructing the current picture according to the predicted pixel value and a prediction residual of the current picture.

Figure 3E:
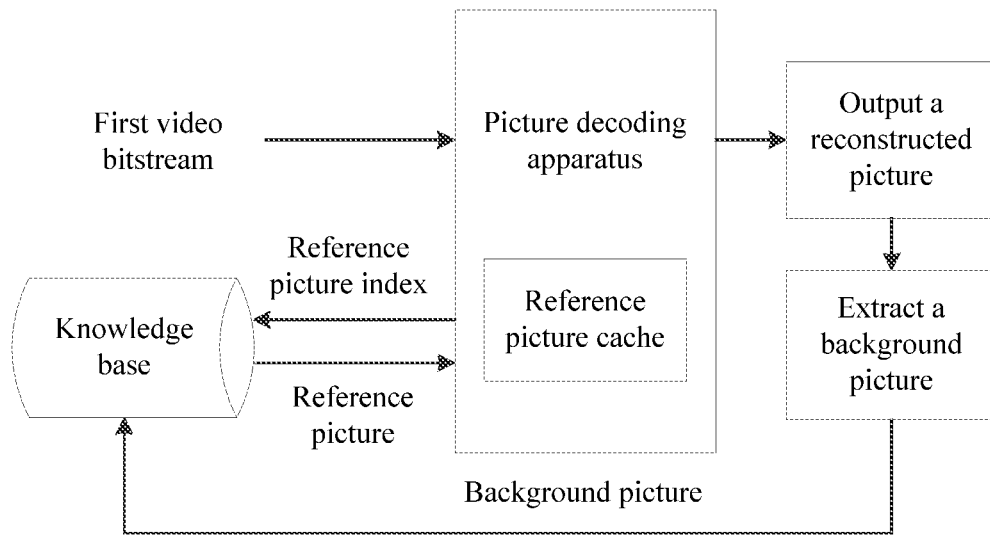
FIG. 3E and FIG. 3F are schematic diagrams of two other picture decoding system architectures according to an embodiment of the present disclosure.

Further, as exemplified in FIG. 3E, the picture decoding apparatus may add, to the knowledge base, a reconstructed picture that is of a background picture and that is obtained by decoding the first video bitstream.

Figure 3F:
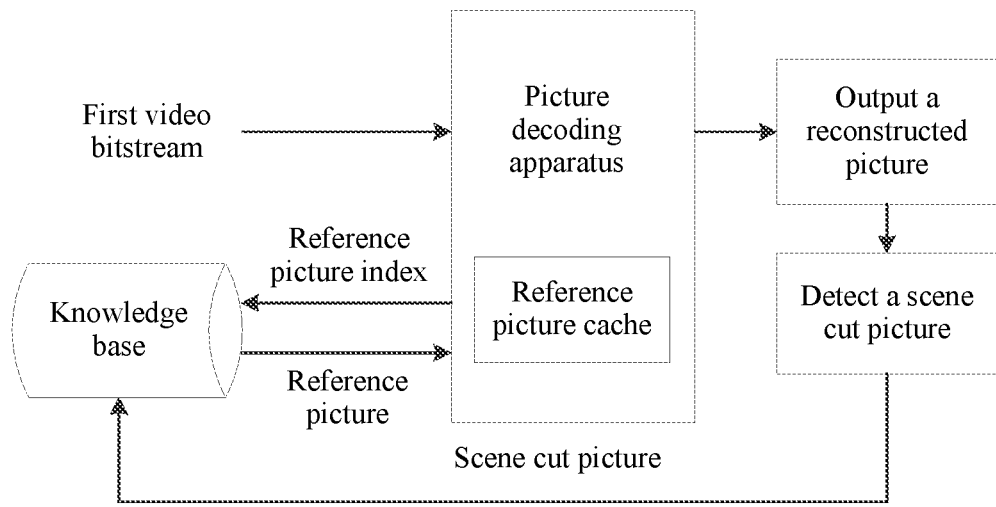

Further, as exemplified in FIG. 3F, scene cut detection may be further performed on a video sequence obtained by decoding the first video bitstream, so as to obtain a scene cut picture in the video sequence obtained by decoding the first video bitstream, and an obtained reconstructed picture of the scene cut picture is added to the knowledge base.

There are multiple relatively mature methods for scene cut detection. For example, an average pixel value difference between multiple groups of pixels in two adjacent pictures is calculated. When the average pixel value difference is greater than a threshold, it is considered that a scene cut occurs between the two pictures. For another example, picture features (such as SIFT) are separately extracted from two pictures. When a degree of matching between the picture features is less than a threshold, it is considered that a scene cut occurs between the two pictures.

Optionally, in some possible implementations of the present disclosure, the method further includes: if no reference picture that matches the reference picture index is found from a second video bitstream, requesting, from a server, an incremental bitstream of the second video bitstream that includes a reference picture that matches the reference picture index, decoding the incremental bitstream of the second video bitstream to obtain the reference picture that matches the reference picture index, and adding, to the reference picture list of the current picture, the obtained reference picture that matches the reference picture index.

, for example, a reference picture cache may be first searched for a reference picture that matches the reference picture index. If no reference picture that matches the reference picture index is found from the reference picture cache, the second video bitstream may be further searched for a reference picture that matches the reference picture index. If no reference picture that matches the reference picture index is found from the second video bitstream, the incremental bitstream of the second video bitstream that includes a reference picture that matches the reference picture index may be further requested from the server, the incremental bitstream of the second video bitstream is decoded to obtain the reference picture that matches the reference picture index, and the obtained reference picture that matches the reference picture index is added to the reference picture list of the current picture.

It may be learned that in a picture decoding process of the solution of this embodiment, after a current picture is obtained, K reference pictures of the current picture may be selected from a knowledge base, and the current picture is decoded according to the K reference pictures. Because at least one picture in the knowledge base does not belong to a random access segment in which the current picture is located, that is, the at least one picture that does not belong to the random access segment in which the current picture is located may be used as a candidate reference picture of the current picture, a picture that does not belong to the random access segment in which the current picture is located may be selected as a reference picture of the current picture. To some extent, this breaks a limitation that is imposed by a conventional technology on a reference picture candidate range of the current picture, and this further helps improve video decoding efficiency to some extent because the solution expands the reference picture candidate range of the current picture to some extent.

Figure 4A:
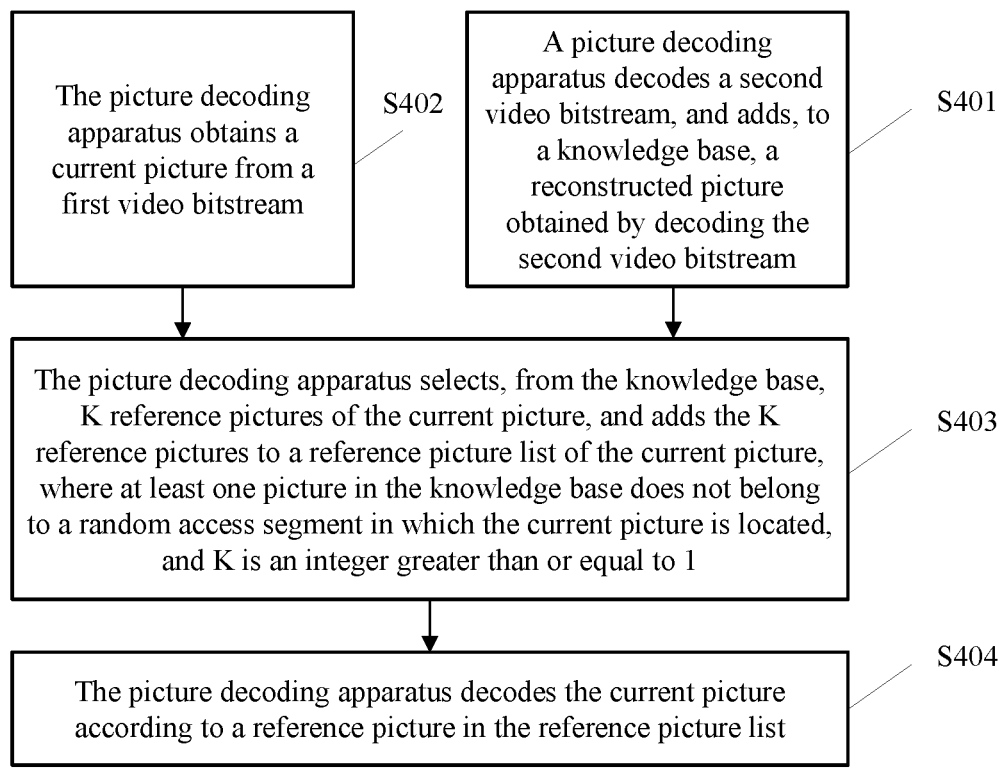
FIG. 4A is a schematic flowchart of a picture decoding method according to an embodiment of the present disclosure.
Figure 4B:
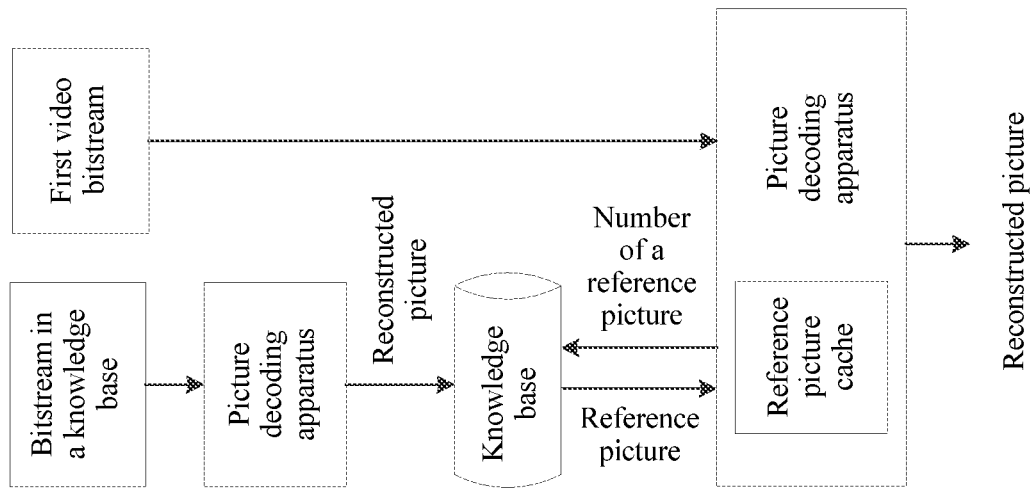
FIG. 4B is a schematic diagram of another picture decoding system architecture according to an embodiment of the present disclosure.

Referring to FIG. 4A and FIG. 4B, FIG. 4A is a schematic flowchart of a picture decoding method according to another embodiment of the present disclosure. The picture decoding method shown in FIG. 4A may be implemented based on a picture decoding system architecture shown in FIG. 4B.

As shown in FIG. 4A, the picture decoding method provided in another embodiment of the present disclosure may include the following steps.

S401. A picture decoding apparatus decodes a second video bitstream (a bitstream in a knowledge base), and adds, to a knowledge base, a reconstructed picture obtained by decoding the second video bitstream.

For example, the picture decoding apparatus may add at least one picture in the second video bitstream to the knowledge base. For another example, a background picture synthesized from multiple pictures in the second video bitstream may be added to the knowledge base.

S402. The picture decoding apparatus obtains a current picture from a first video bitstream.

In a picture decoding process, the current picture may be referred to as a current to-be-decoded picture, corresponding to a part of the first video bitstream.

The picture decoding apparatus may include a reference picture cache. The reference picture cache may store a short-term reference picture and a long-term reference picture for prediction for the current to-be-decoded picture.

The first video bitstream and the second video bitstream are different video bitstreams. For example, a number of a picture in the first video bitstream is independent from a number of a picture in the second video bitstream. The number of the picture in the first video bitstream indicates a relative relationship between pictures in a display order. For example, a picture with a relatively small number appears before a picture with a relatively large number in the display order. The number of the picture in the second video bitstream may not indicate a chronological order. Pictures that are respectively in the first video bitstream and the second video bitstream and that have a same number are not necessarily corresponding to a same moment.

S403. The picture decoding apparatus selects, from the knowledge base, K reference pictures of the current picture, and adds the K reference pictures to a reference picture list of the current picture, where at least one picture in the knowledge base does not belong to a random access segment in which the current picture is located, and K is an integer greater than or equal to 1.

The knowledge base may be considered as a picture set that can accommodate candidate reference pictures of the current picture, and some or all pictures in the knowledge base may be selected as reference pictures of the current picture. A picture in the knowledge base may be an original picture, or may be a reconstructed picture. The knowledge base may include at least two pictures.

Particularly, pictures in the knowledge base may be pictures prestored in the picture decoding apparatus. The pictures may not be corresponding to pictures in a video sequence in which the current picture is located, for example, may include a picture that includes multiple patterns, or may include a picture rendered by a computer, or may even include a picture that is downloaded from a network and added to the knowledge base, or may include a picture that is copied from a portable storage device into the knowledge base. The knowledge base may be set to a dynamic accumulation state, in which included pictures are continuously updated in quantity and content as time goes by. The pictures may include a picture on which compression coding is not performed, and also include a picture that does not belong to the random access segment in which the current picture is located.

Because at least one picture in the knowledge base does not belong to the random access segment in which the current picture is located, that is, the at least one picture that does not belong to the random access segment in which the current picture is located may be used as a candidate reference picture of the current picture, a picture that does not belong to the random access segment in which the current picture is located may be selected as a reference picture of the current picture. Therefore, at least one picture in the K reference pictures may not belong to the random access segment in which the current picture is located, and certainly, in some cases, all the K reference pictures may belong to the random access segment in which the current picture is located.

In different scenarios, manners of defining the random access segment in which the current picture is located may not be the same. For example, the random access segment in which the current picture is located may include pictures that are arranged in a decoding order from a closest random access point before the current picture to a closest random access point after the current picture at a video layer at which the current picture is located, and the random access segment in which the current picture is located includes a picture at the closest random access point before the current picture, but does not include a picture at the closest random access point after the current picture. Alternatively, if the current picture is located at a dependent layer, the random access segment in which the current picture is located includes pictures that are arranged in a decoding order from a closest random access point before the current picture to a closest random access point after the current picture at a video layer at which the current picture is located, and includes pictures that are arranged in a decoding order from a closest random access point before X reference pictures of the current picture to a closest random access point after the X reference pictures at a video layer at which the X reference pictures are located, the random access segment in which the current picture is located includes a picture at the closest random access point before the current picture, but does not include a picture at the closest random access point after the current picture, the random access segment in which the current picture is located includes a picture at the closest random access point before the X reference pictures, but does not include a picture at the closest random access point after the X reference pictures, and the X reference pictures are reference pictures of the current picture that are at another video layer other than the dependent layer.

It should be noted that if the current picture is located at a random access point, the closest random access point before the current picture is the random access point at which the current picture is located, and if a reference picture that is of the current picture and that is at another video layer is located at a random access point, the closest random access point before the reference picture is the random access point at which the reference picture is located.

In addition, in some encoding structures, for example, in a video bitstream obtained by encoding, by using a hierarchical B (Hierarchical B) frame structure, the video sequence in which the current picture is located, the random access segment in which the current picture is located may further include a second closest random access point before the current picture.

Optionally, in some possible implementations of the present disclosure, the selecting, from a knowledge base, K reference pictures of the current picture may include: selecting, from the knowledge base, the K reference pictures of the current picture based on a reference picture index that is of the current picture and that is obtained by decoding the first video bitstream to which the current picture belongs.

The reference picture index of the current picture may indicate at least one of a number of a reference picture, a picture feature of a reference picture, or a picture feature of the current picture. For example, if the reference picture index indicates the picture feature of the current picture, picture features of the K reference pictures match the picture feature of the current picture. That the picture features of the K reference pictures match the picture feature of the current picture may mean that degrees of similarity between the picture features of the K reference pictures and the picture feature of the current picture exceed a specified threshold (for example, the threshold may be 70%, 85%, 88%, or another value that meets a requirement). Alternatively, the degrees of similarity between the picture features of the K reference pictures and the picture feature of the current picture may be greater than or equal to a degree of similarity between the picture feature of the current picture and a picture feature of another picture in the knowledge base. For example, the degree of similarity is a linear correlation between two picture feature vectors, or a reciprocal of a largest difference between groups of elements in two picture feature vectors, or a reciprocal of a Hamming distance between two picture feature vectors.

Optionally, in some possible implementations of the present disclosure, for example, the picture feature may include at least one of scale-invariant feature transform (SIFT) of the picture or speeded up robust features (SURF) of the picture, and certainly, may include another picture feature.

S404. The picture decoding apparatus decodes the current picture according to a reference picture in the reference picture list.

That the picture decoding apparatus decodes the current picture according to a reference picture in the reference picture list may include: performing prediction for the current picture according to the K reference pictures to obtain a predicted pixel value of the current picture, and obtaining a reconstructed picture of the current picture by reconstructing the current picture according to the predicted pixel value and a prediction residual of the current picture.

Optionally, in some possible implementations of the present disclosure, the method further includes: if no reference picture that matches the reference picture index is found from the second video bitstream, requesting, from a server, an incremental bitstream of the second video bitstream that includes a reference picture that matches the reference picture index, decoding the incremental bitstream of the second video bitstream to obtain the reference picture that matches the reference picture index, and adding, to the reference picture list of the current picture, the obtained reference picture that matches the reference picture index.

, for example, a reference picture cache may be first searched for a reference picture that matches the reference picture index. If no reference picture that matches the reference picture index is found from the reference picture cache, the second video bitstream may be further searched for a reference picture that matches the reference picture index. If no reference picture that matches the reference picture index is found from the second video bitstream, the incremental bitstream of the second video bitstream that includes a reference picture that matches the reference picture index may be further requested from the server, the incremental bitstream of the second video bitstream is decoded to obtain the reference picture that matches the reference picture index, and the obtained reference picture that matches the reference picture index is added to the reference picture list of the current picture.

It may be learned that in a picture decoding process of the solution of this embodiment, after a current picture is obtained, K reference pictures of the current picture may be selected from a knowledge base, and the current picture is decoded according to the K reference pictures. Because at least one picture in the knowledge base does not belong to a random access segment in which the current picture is located, that is, the at least one picture that does not belong to the random access segment in which the current picture is located may be used as a candidate reference picture of the current picture, a picture that does not belong to the random access segment in which the current picture is located may be selected as a reference picture of the current picture. To some extent, this breaks a limitation that is imposed by a conventional technology on a reference picture candidate range of the current picture, and this further helps improve video decoding efficiency to some extent because the solution expands the reference picture candidate range of the current picture to some extent.

Some more specific application scenarios are used below as examples for description. It is assumed that if the foregoing solution is applied to an online streaming scenario, a user terminal (a picture decoding apparatus) sends video access time information to a server side when a video is demanded. For example, the video access time information is an interval between an access point and opening credits.

The server sends two video bitstreams (a first video bitstream and a second video bitstream) to the user terminal according to the video access time information. A quantity of pictures included in the second video bitstream is generally less than a quantity of pictures included in the first video bitstream.

For another example, if the foregoing solution is applied to an offline streaming scenario, a user terminal (a picture decoding apparatus) may download a first video bitstream in an offline manner. The user terminal decodes the first video bitstream when a video is watched, and displays a decoded picture of the first video bitstream.

For example, a decoding process of a user terminal may include at least one of the following processing manners:

Processing manner 1: In a process of decoding a first video bitstream by the user terminal, if it is found that a current picture needs to be decoded with reference to a specified picture in a second video bitstream, and the second video bitstream stored in the user terminal does not include the specified picture, the user terminal requests a server side to send an incremental bitstream of the second video bitstream that includes the specified picture. The user terminal receives the incremental bitstream of the second video bitstream, incorporates the incremental bitstream of the second video bitstream into the second video bitstream, decodes the incremental bitstream of the second video bitstream to obtain the specified picture, uses the specified picture as a reference picture of the current picture, and adds the specified picture to a reference picture list of the current picture. The user terminal decodes the current picture by using the reference picture list.

Processing manner 2: In a process of decoding a first video bitstream by the user terminal, if it is found that a current picture needs to be decoded with reference to a specified picture in a second video bitstream, and a memory that is of the user terminal and that stores decoded pictures of the second video bitstream includes the specified picture, the user terminal may use the specified picture as a reference picture of the current to-be-decoded picture, and add the specified picture to a reference picture list of the current to-be-decoded picture. The user terminal decodes the current picture by using the reference picture list.

Processing manner 3: In a process of decoding a first video bitstream by the user terminal, if it is found that a current picture needs to be decoded with reference to a specified picture in a second video bitstream, and the second video bitstream stored in the user terminal includes the specified picture, but a memory that is of the user terminal and that stores decoded pictures of the second video bitstream does not include the specified picture, the user terminal decodes a corresponding bitstream segment in the second video bitstream to obtain the specified picture, uses the specified picture as a reference picture of the current picture, and adds the specified picture to a reference picture list of the current picture. The user terminal decodes the current picture by using the reference picture list. The specified picture may be added to the memory that stores the decoded pictures of the second video bitstream.

For another example, a first video bitstream and a second video bitstream may be stored in a storage medium such as an optical disc or a magnetic disk. A number of a picture in the first video bitstream is independent from a number of a picture in the second video bitstream. For example, the number of the picture is a picture order count (POC, Picture Order Count) that is used to indicate a display order and that is used in a video coding standard such as H.264. A quantity of pictures included in the second video bitstream is generally less than a quantity of pictures included in the first video bitstream.

A picture decoding apparatus may use the following solution to decode at least one picture in the first video bitstream.

First, based on the second video bitstream, the picture decoding apparatus obtains at least one specified reconstructed picture for a current picture. More, a storage apparatus that stores a decoded reconstructed picture of the first video bitstream is referred to as a first storage apparatus, and a storage apparatus that stores a decoded reconstructed picture of the second video bitstream is referred to as a second storage apparatus. According to a reference picture index corresponding to the current picture in the first video bitstream, the second storage apparatus is searched for a reconstructed picture that matches the reference picture index, that is, a specified reconstructed picture. If no specified reconstructed picture is found from the second storage apparatus, the second video bitstream is parsed, a target picture bitstream corresponding to the reference picture index is found from the second video bitstream, the target picture bitstream is decoded to obtain a specified reconstructed picture, and the specified reconstructed picture is put into the second storage apparatus. The reference picture index may include one or more numbers. Each number is corresponding to one of decoded pictures of the second video bitstream. A quantity of specified reconstructed pictures is the same as a quantity of numbers included in the reference picture index. Particularly, if the second storage apparatus is full when specified reconstructed pictures are added to the second storage apparatus, pictures of a corresponding quantity in the second storage apparatus are replaced by the specified reconstructed pictures. The reference picture index may be stored in the first video bitstream, for example, stored in a slice header (slice header) of the current picture, or may be stored in a syntactic structure unit such as a sequence parameter set (SPS, sequence parameter set). In addition, the reference picture index may be stored in other storage space other than the first video bitstream. For example, multiple reference picture indexes form a data structure, and the data structure is encoded and then stored in the second video bitstream. A picture in the second video bitstream may be decoded in an intra decoding manner, or may be decoded in an inter decoding manner that is based on inter prediction.

The picture decoding apparatus may use a specified reconstructed picture as a reference picture of the current picture in the first video bitstream, and decode the current picture to obtain a reconstructed picture of the current picture. A reference picture of the current picture may further include another picture. For example, the reference picture of the current picture may include a decoded picture in a random access segment in which the current picture is located. A decoding method may be an inter video decoding method that is based on inter prediction.

More, to reduce complexity, only a picture at a random access point in the first video bitstream can be decoded by using a reconstructed picture in the second video bitstream as a reference picture. The conventional intra decoding manner may be used for pictures at some random access points. Different frame types may be used in the first video bitstream to distinguish between the two types of pictures at random access points. A picture at a non-random access point in the second video bitstream may be only a decoded picture in the random access segment in which the current picture is located. For example, a picture in the second video bitstream may be decoded only in the intra decoding manner.

The picture decoding apparatus may sequentially display decoded pictures in the first video bitstream according to picture order counts of all the decoded pictures in the first video bitstream.

Other decoding scenarios are not enumerated herein.

Figure 5A:
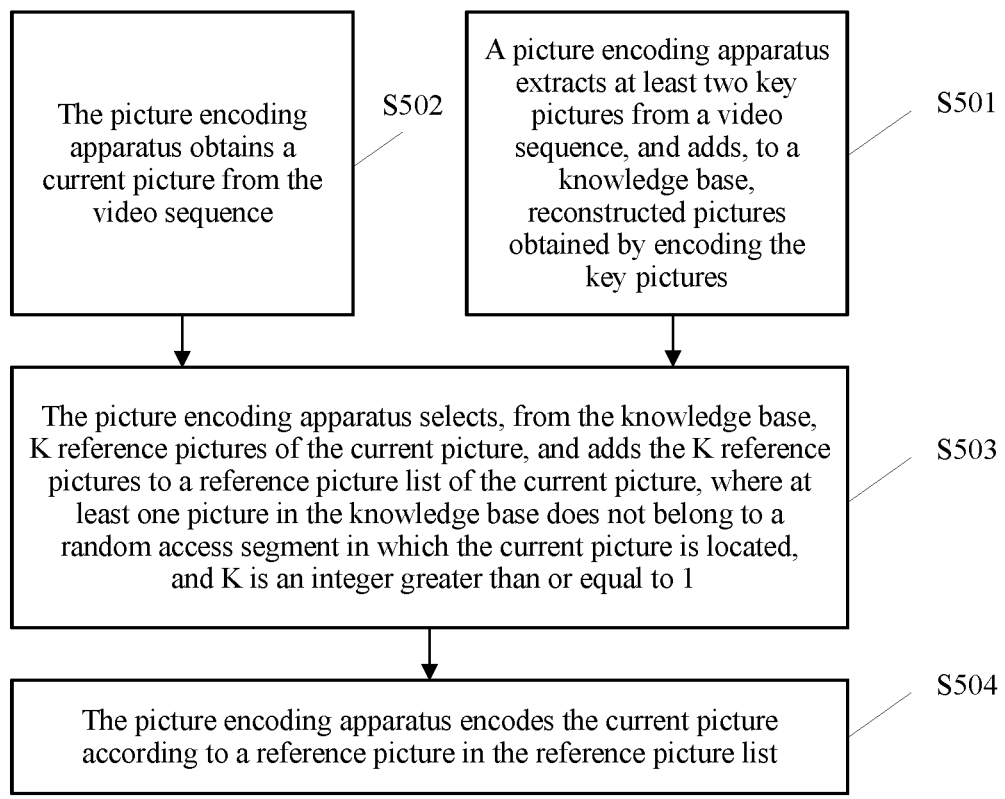
FIG. 5A is a schematic flowchart of another picture encoding method according to an embodiment of the present disclosure.
Figure 5B:
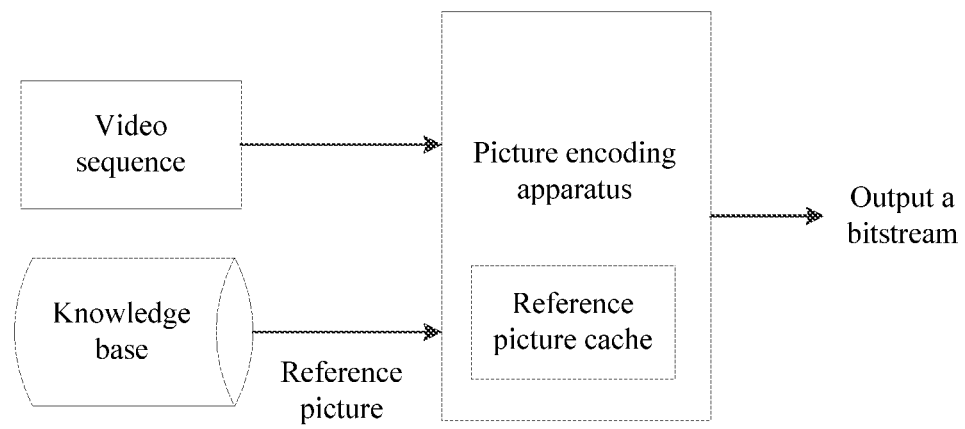
FIG. 5B to FIG. 5D are schematic diagrams of three picture encoding system architectures according to an embodiment of the present disclosure.

Referring to FIG. 5A and FIG. 5B, FIG. 5A is a schematic flowchart of a picture encoding method according to another embodiment of the present disclosure. The picture encoding method shown in FIG. 5A may be implemented based on a picture encoding system architecture shown in FIG. 5B.

As shown in FIG. 5A, the picture encoding method provided in another embodiment of the present disclosure may include the following steps.

S501. A picture encoding apparatus extracts at least two key pictures from a video sequence, and adds, to a knowledge base, reconstructed pictures obtained by encoding the key pictures.

Figure 5C:
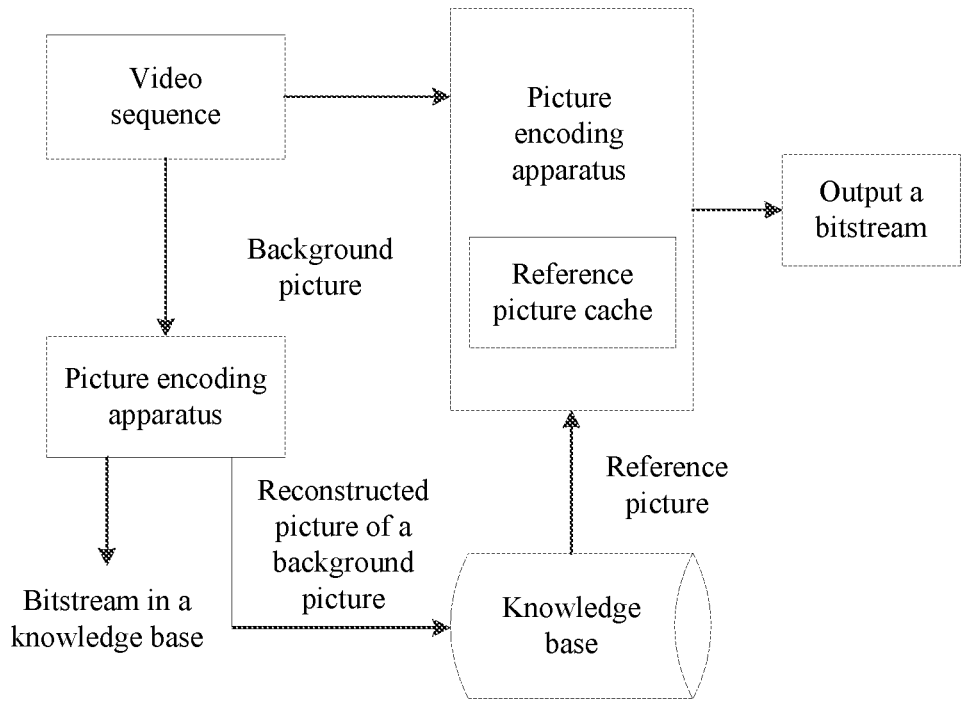

As exemplified in FIG. 5C, the picture encoding apparatus may perform background modeling on the video sequence to which a current picture belongs, to obtain a background picture, encode the background picture to obtain an encoded background picture, decode the encoded background picture to obtain a reconstructed picture of the background picture, and add the obtained reconstructed picture of the background picture to the knowledge base.

Figure 5D:
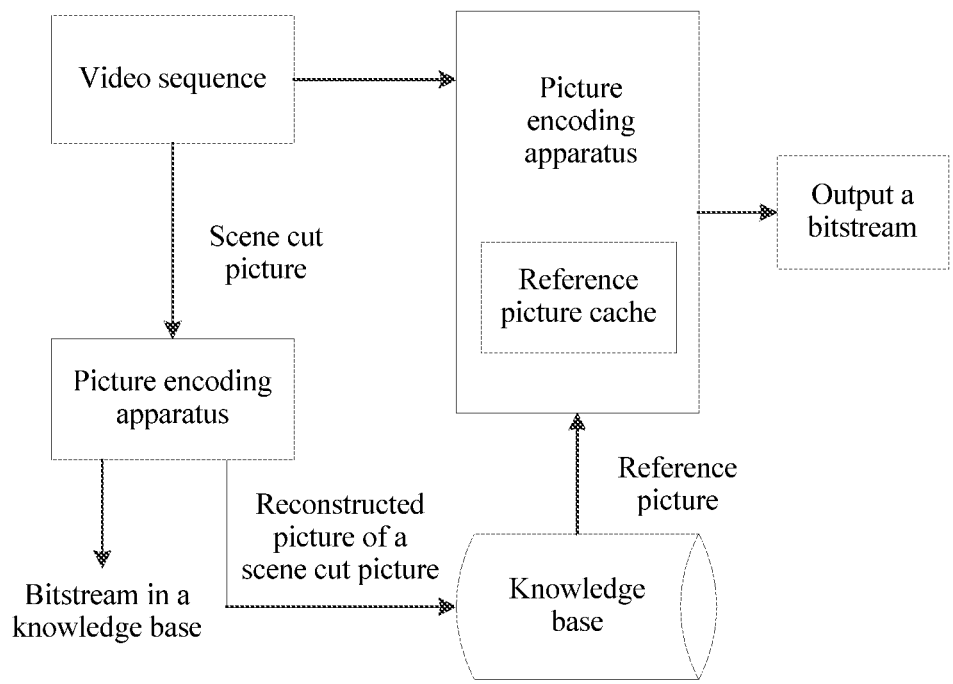

As exemplified in FIG. 5D, the picture encoding apparatus may perform scene cut detection on the video sequence to which a current picture belongs, to obtain a scene cut picture in the video sequence to which the current picture belongs, and add an obtained reconstructed picture of the scene cut picture to the knowledge base. There are multiple relatively mature methods for scene cut detection. For example, an average pixel value difference between multiple groups of pixels in two adjacent pictures is calculated. When the average pixel value difference is greater than a threshold, it is considered that a scene cut occurs between the two pictures. For another example, picture features (such as SIFT) are separately extracted from two pictures. When a degree of matching between the picture features is less than a threshold, it is considered that a scene cut occurs between the two pictures.

A method that may be used to extract a key picture may include: calculating an average pixel value difference between at least one picture in the video sequence and a picture adjacent to the at least one picture in a time domain, and using, as a key picture, a picture corresponding to an average pixel value difference less than a preset threshold; or using at least one picture at a preset location of the video sequence as a key picture. For example, the picture at a preset location includes at least one of the first picture, the second picture, or the last picture.

S502. The picture encoding apparatus obtains a current picture from the video sequence.

In a picture encoding process, the current picture may be referred to as a current to-be-encoded picture, corresponding to a picture in the video sequence.

The picture encoding apparatus may include a reference picture cache. The reference picture cache may store a short-term reference picture and a long-term reference picture for prediction for the current to-be-encoded picture.

S503. The picture encoding apparatus selects, from the knowledge base, K reference pictures of the current picture, and adds the K reference pictures to a reference picture list of the current picture, where at least one picture in the knowledge base does not belong to a random access segment in which the current picture is located, and K is an integer greater than or equal to 1.

The knowledge base may be considered as a picture set that can accommodate candidate reference pictures of the current picture, and some or all pictures in the knowledge base may be selected as reference pictures of the current picture. A picture in the knowledge base may be an original picture, or may be a reconstructed picture. The knowledge base may include at least two pictures.

Optionally, in some possible implementations of the present disclosure, that the picture encoding apparatus selects, from the knowledge base, K reference pictures of the current picture may include: selecting the K reference pictures of the current picture based on at least one of the following methods.

Method 1: At least one picture that is most similar to the current picture is selected from the knowledge base. Multiple similarity metrics (similarity metric) such as a mean square error and a SIFT feature difference may be used in similarity calculation.

Method 2: A picture in the knowledge base is added to the reference picture list of the current picture, and precoding is performed to obtain a rate-distortion cost (RD cost, rate-distortion cost) of the current picture. Rate-distortion cost calculation is performed on at least two pictures in the knowledge base, and a picture corresponding to a smallest rate-distortion cost in the at least two pictures is selected as a reference picture of the current picture.

Method 3: In pictures prestored in the knowledge base, a picture that includes a pattern similar to that in an area of the current picture is selected from the pictures as a reference picture of the current picture.

Particularly, pictures in the knowledge base may include pictures prestored in the picture encoding apparatus. The pictures may not be corresponding to pictures in the video sequence in which the current picture is located, for example, may include a picture that includes multiple patterns, or may include a picture rendered by a computer, or may even include a picture that is downloaded from a network and added to the knowledge base, or may include a picture that is copied from a portable storage device into the knowledge base. The knowledge base may be set to a dynamic accumulation state, in which included pictures are continuously updated in quantity and content as time goes by. The pictures may include a picture on which compression coding is not performed, and also include a picture that does not belong to the random access segment in which the current picture is located.

Because at least one picture in the knowledge base does not belong to the random access segment in which the current picture is located, that is, the at least one picture that does not belong to the random access segment in which the current picture is located may be used as a candidate reference picture of the current picture, a picture that does not belong to the random access segment in which the current picture is located may be selected as a reference picture of the current picture. Therefore, at least one picture in the K reference pictures may not belong to the random access segment in which the current picture is located, and certainly, in some cases, all the K reference pictures may belong to the random access segment in which the current picture is located.

In different scenarios, manners of defining the random access segment in which the current picture is located may not be the same. For example, the random access segment in which the current picture is located may include pictures that are arranged in an encoding order from a closest random access point before the current picture to a closest random access point after the current picture at a video layer at which the current picture is located, and the random access segment in which the current picture is located includes a picture at the closest random access point before the current picture, but does not include a picture at the closest random access point after the current picture. Alternatively, if the current picture is located at a dependent layer, the random access segment in which the current picture is located includes pictures that are arranged in an encoding order from a closest random access point before the current picture to a closest random access point after the current picture at a video layer at which the current picture is located, and includes pictures that are arranged in an encoding order from a closest random access point before X reference pictures of the current picture to a closest random access point after the X reference pictures at a video layer at which the X reference pictures are located, the random access segment in which the current picture is located includes a picture at the closest random access point before the current picture, but does not include a picture at the closest random access point after the current picture, the random access segment in which the current picture is located includes a picture at the closest random access point before the X reference pictures, but does not include a picture at the closest random access point after the X reference pictures, and the X reference pictures are reference pictures of the current picture that are at another video layer other than the dependent layer.

It should be noted that if the current picture is located at a random access point, the closest random access point before the current picture is the random access point at which the current picture is located, and if a reference picture that is of the current picture and that is at another video layer is located at a random access point, the closest random access point before the reference picture is the random access point at which the reference picture is located.

In addition, in some encoding structures, for example, in a video bitstream obtained by encoding, by using a hierarchical B (Hierarchical B) frame structure, the video sequence in which the current picture is located, the random access segment in which the current picture is located may further include a second closest random access point before the current picture.

Optionally, in some possible implementations of the present disclosure, that the picture encoding apparatus selects, from the knowledge base, K reference pictures of the current picture may include: selecting, from the knowledge base, the K reference pictures of the current picture based on a picture feature of the current picture. Picture features of the K reference pictures match the picture feature of the current picture. That the picture features of the K reference pictures match the picture feature of the current picture may mean that degrees of similarity between the picture features of the K reference pictures and the picture feature of the current picture exceed a specified threshold (for example, the threshold may be 70%, 85%, 88%, or another value that meets a requirement). Alternatively, the degrees of similarity between the picture features of the K reference pictures and the picture feature of the current picture may be greater than or equal to a degree of similarity between the picture feature of the current picture and a picture feature of another picture in the knowledge base.

Optionally, in some possible implementations of the present disclosure, for example, the picture feature may include at least one of scale-invariant feature transform (SIFT) of the picture or speeded up robust features (SURF) of the picture, and certainly, may include another picture feature.

S504. The picture encoding apparatus encodes the current picture according to a reference picture in the reference picture list.

That the picture encoding apparatus encodes the current picture according to a reference picture in the reference picture list may include: performing prediction for the current picture according to the K reference pictures to obtain a predicted pixel value of the current picture, and obtaining a reconstructed picture of the current picture by reconstructing the current picture according to the predicted pixel value and a prediction residual of the current picture.

Further, the picture encoding method may further include: adding, by the picture encoding apparatus, knowledge base reference information (that is, a reference picture index) to the first video bitstream. Information about a picture that is in the knowledge base and that is referred to for the current to-be-encoded picture is recorded in the knowledge base reference information, and the knowledge base reference information may be at least one of a picture number of a picture in the knowledge base, a picture feature descriptor, or an MD5 check code of a picture. For example, the picture feature includes at least one of SIFT or SURF. When the knowledge base includes multiple types of pictures, the knowledge base reference information may further include picture type information. For example, when it is configured that the knowledge base includes N background pictures and M scene cut pictures (N and M are positive integers), an index of a picture in the knowledge base may be indicated by using a picture type and a number of a picture in the pictures corresponding to the picture type. Particularly, when it is configured that the knowledge base includes multiple types of pictures and each type is corresponding to only one picture, a picture type may be directly used to indicate a picture in the knowledge base.

Further, the picture encoding apparatus may further store or send a second video bitstream obtained by encoding a key picture. The picture encoding apparatus may further store or send the first video bitstream.

It may be learned that in a picture encoding process of the solution of this embodiment, after a current picture is obtained, K reference pictures of the current picture may be selected from a knowledge base, and the current picture is encoded according to the K reference pictures. Because at least one picture in the knowledge base does not belong to a random access segment in which the current picture is located, that is, the at least one picture that does not belong to the random access segment in which the current picture is located may be used as a candidate reference picture of the current picture, a picture that does not belong to the random access segment in which the current picture is located may be selected as a reference picture of the current picture. To some extent, this breaks a limitation that is imposed by a conventional technology on a reference picture candidate range of the current picture, and this further helps improve video coding efficiency to some extent because the solution expands the reference picture candidate range of the current picture to some extent.

An embodiment of the present disclosure provides a video bitstream. The video bitstream includes a picture A, and also includes a picture feature of the picture A. For example, the picture feature includes at least one of SIFT or SURF. When the picture A is decoded, a picture feature of at least one picture in a knowledge base is calculated. If a difference between a picture feature of at least one picture in the knowledge base and the picture feature of the picture A is less than a specified threshold, the at least one picture in the knowledge base is selected as a reference picture of the picture A.

An embodiment of the present disclosure provides a video bitstream, including at least one of a first video bitstream and a second video bitstream. The first video bitstream includes a picture A, the second video bitstream includes a picture B, and the first video bitstream further includes a picture feature of the picture B. For example, the picture feature includes at least one of SIFT or SURF. The picture feature of the picture B is associated with the picture A. For example, a picture number of the picture B may be stored in slice header information in a bitstream segment corresponding to the picture A. When the picture A is decoded, the second video bitstream is first decoded and a reconstructed picture of the second video bitstream is stored in a knowledge base. Then, the picture feature of the picture B is obtained by parsing the first video bitstream, and the picture B is retrieved from the knowledge base as a reference picture of the picture A by using the picture feature of the picture B, to decode the picture A.

An embodiment of the present disclosure provides a video bitstream, including at least one of a first video bitstream and a second video bitstream. The first video bitstream includes a picture A, the second video bitstream includes a picture B, and the first video bitstream further includes a picture number of the picture B in the second video bitstream. The picture number of the picture B is associated with the picture A. For example, the picture number of the picture B may be stored in slice header information in a bitstream segment corresponding to the picture A. The picture number of the picture B is independent from a picture number of the picture A in the first video bitstream. For example, the picture number of the picture B is stored in the slice header information in the bitstream segment corresponding to the picture A in an absolute value form of the picture number rather than a form of a difference value between the picture number of the picture B and the picture number of the picture A. When the picture A is decoded, the first video bitstream may be first decoded to obtain the picture number of the picture B, and a bitstream segment corresponding to the picture B is then found from the second video bitstream by using the picture number of the picture B. After the picture B is obtained by decoding, the picture B is used as a reference picture of the picture A, and is added to a reference picture list of the picture A, to decode the picture A.

For example, the first video bitstream and the second video bitstream each use a set of picture numbers. That is, there is no association between a picture number of a picture in the second video bitstream and a picture number of a picture in the first video bitstream. In terms of time, a picture in the first video bitstream is not necessarily later than a picture that has a smaller picture number and that is in the second video bitstream. A picture number of a picture in the first video bitstream indicates a display order, and a picture number of a picture in the second video bitstream may not be restricted by the display order. A picture number of each picture in the second video bitstream may be obtained by numbering the picture according to a quantity of times of using the picture as a reference picture for a picture in the first video bitstream. For example, a larger quantity of times of using a picture in the second video bitstream as a reference picture leads to a smaller picture number of the picture. A decoded picture of the first video bitstream is displayed, and a decoded picture of the second video bitstream is not displayed.

Figure 6:
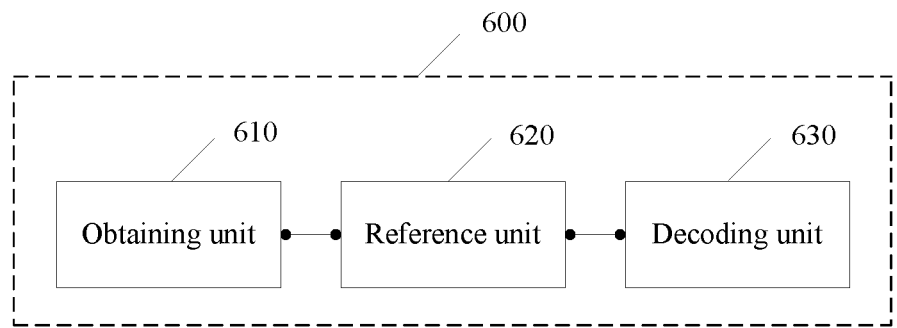
FIG. 6 is a schematic structural diagram of a picture decoding apparatus according to an embodiment of the present disclosure.

Referring to FIG. 6, an embodiment of the present disclosure provides a picture decoding apparatus. The picture decoding apparatus may include:

an obtaining unit 610, configured to obtain a current picture;

a reference unit 620, configured to select, from a knowledge base, K reference pictures of the current picture, where at least one picture in the knowledge base does not belong to a random access segment in which the current picture is located, and K is an integer greater than or equal to 1; and a decoding unit 630, configured to decode the current picture according to the K reference pictures.

Optionally, in some possible implementations of the present disclosure, at least one picture in the knowledge base is obtained by decoding a second video bitstream.

Optionally, in some possible implementations of the present disclosure, the reference unit 620 is configured to select, from the knowledge base, the K reference pictures of the current picture based on a reference picture index that is of the current picture and that is obtained by decoding a first video bitstream to which the current picture belongs.

Optionally, in some possible implementations of the present disclosure, a reference picture that matches the reference picture index is a reconstructed picture before the random access segment in which the current picture is located.

Optionally, in some possible implementations of the present disclosure, the reference unit is further configured to: if no reference picture that matches the reference picture index is found from the second video bitstream, request, from a server, an incremental bitstream of the second video bitstream that includes a reference picture that matches the reference picture index, decode the incremental bitstream of the second video bitstream to obtain the reference picture that matches the reference picture index, and use, as a reference picture of the current picture, the obtained reference picture that matches the reference picture index.

Optionally, in some possible implementations of the present disclosure, the reference picture index of the current picture may indicate at least one of a number of a reference picture, a picture feature of a reference picture, or a picture feature of the current picture.

Optionally, in some possible implementations of the present disclosure, if the reference picture index indicates the picture feature of the current picture, picture features of the K reference pictures match the picture feature of the current picture.

Optionally, in some possible implementations of the present disclosure, the picture feature includes at least one of scale-invariant feature transform SIFT or speeded up robust features SURF.

Optionally, in some possible implementations of the present disclosure, the knowledge base includes a key picture in a video sequence to which the current picture belongs, and the key picture in the video sequence to which the current picture belongs includes at least one of a scene cut picture or a background picture in the video sequence to which the current picture belongs.

Optionally, in some possible implementations of the present disclosure, the scene cut picture is obtained by decoding the second video bitstream or the first video bitstream to which the current picture belongs, or the background picture is obtained by decoding the second video bitstream or the first video bitstream to which the current picture belongs, or the background picture is obtained by performing background modeling on a decoded video sequence in the first video bitstream to which the current picture belongs.

Optionally, in some possible implementations of the present disclosure, the decoding unit 630 is configured to add the K reference pictures to a reference picture list of the current picture, and decode the current picture according to a reference picture in the reference picture list.

Optionally, in some possible implementations of the present disclosure, the random access segment in which the current picture is located includes pictures that are arranged in a decoding order from a closest random access point before the current picture to a closest random access point after the current picture at a video layer at which the current picture is located, and the random access segment in which the current picture is located includes a picture at the closest random access point before the current picture, but does not include a picture at the closest random access point after the current picture; or if the current picture is located at a dependent layer, the random access segment in which the current picture is located includes pictures that are arranged in a decoding order from a closest random access point before the current picture to a closest random access point after the current picture at a video layer at which the current picture is located, and includes pictures that are arranged in a decoding order from a closest random access point before X reference pictures of the current picture to a closest random access point after the X reference pictures at a video layer at which the X reference pictures are located, the random access segment in which the current picture is located includes a picture at the closest random access point before the current picture, but does not include a picture at the closest random access point after the current picture, the random access segment in which the current picture is located includes a picture at the closest random access point before the X reference pictures, but does not include a picture at the closest random access point after the X reference pictures, and the X reference pictures are reference pictures of the current picture that are at another video layer other than the dependent layer.

It may be understood that functions of function modules of the picture decoding apparatus 600 in this embodiment may be implemented according to the method in the foregoing method embodiment. For a specific implementation process, refer to related descriptions of the foregoing method embodiment. Details are not described herein again.

It may be learned that in a picture decoding process of the picture decoding apparatus 600 in this embodiment, after a current picture is obtained, K reference pictures of the current picture may be selected from a knowledge base, and the current picture is decoded according to the K reference pictures. Because at least one picture in the knowledge base does not belong to a random access segment in which the current picture is located, that is, the at least one picture that does not belong to the random access segment in which the current picture is located may be used as a candidate reference picture of the current picture, a picture that does not belong to the random access segment in which the current picture is located may be selected as a reference picture of the current picture. To some extent, this breaks a limitation that is imposed by a conventional technology on a reference picture candidate range of the current picture, and this further helps improve video decoding efficiency to some extent because the solution expands the reference picture candidate range of the current picture to some extent.

Figure 7:
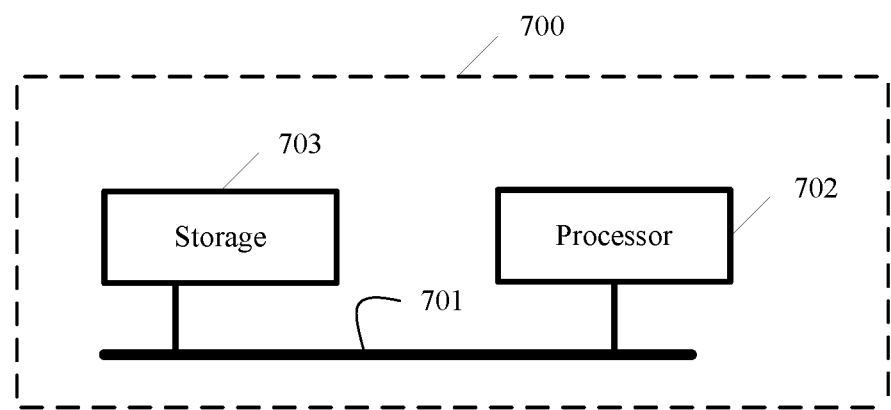
FIG. 7 is a schematic structural diagram of another picture decoding apparatus according to an embodiment of the present disclosure.

Referring to FIG. 7, a picture decoding apparatus 700 provided in an embodiment of the present disclosure may include:

a processor 702 and a storage 703. The processor 702 is coupled and connected to the storage 703 by using a bus 701.

The processor 702 invokes code or an instruction in the storage 703, to obtain a current picture; select, from a knowledge base, K reference pictures of the current picture, where at least one picture in the knowledge base does not belong to a random access segment in which the current picture is located, and K is an integer greater than or equal to 1; and decode the current picture according to the K reference pictures.

Optionally, in some possible implementations of the present disclosure, at least one picture in the knowledge base is obtained by decoding a second video bitstream.

Optionally, in some possible implementations of the present disclosure, the processor 702 is configured to select, from the knowledge base, the K reference pictures of the current picture based on a reference picture index that is of the current picture and that is obtained by decoding a first video bitstream to which the current picture belongs.

Optionally, in some possible implementations of the present disclosure, a reference picture that matches the reference picture index is a reconstructed picture before the random access segment in which the current picture is located.

Optionally, in some possible implementations of the present disclosure, the processor 702 is further configured to: if no reference picture that matches the reference picture index is found from the second video bitstream, request, from a server, an incremental bitstream of the second video bitstream that includes a reference picture that matches the reference picture index, decode the incremental bitstream of the second video bitstream to obtain the reference picture that matches the reference picture index, and use, as a reference picture of the current picture, the obtained reference picture that matches the reference picture index.

Optionally, in some possible implementations of the present disclosure, the reference picture index of the current picture may indicate at least one of a number of a reference picture, a picture feature of a reference picture, or a picture feature of the current picture.

Optionally, in some possible implementations of the present disclosure, if the reference picture index indicates the picture feature of the current picture, picture features of the K reference pictures match the picture feature of the current picture.

Optionally, in some possible implementations of the present disclosure, the picture feature includes at least one of scale-invariant feature transform SIFT or speeded up robust features SURF.

Optionally, in some possible implementations of the present disclosure, the knowledge base includes a key picture in a video sequence to which the current picture belongs, and the key picture in the video sequence to which the current picture belongs includes at least one of a scene cut picture or a background picture in the video sequence to which the current picture belongs.

Optionally, in some possible implementations of the present disclosure, the scene cut picture is obtained by decoding the second video bitstream or the first video bitstream to which the current picture belongs, or the background picture is obtained by decoding the second video bitstream or the first video bitstream to which the current picture belongs, or the background picture is obtained by performing background modeling on a decoded video sequence in the first video bitstream to which the current picture belongs.

Optionally, in some possible implementations of the present disclosure, the processor 702 is configured to add the K reference pictures to a reference picture list of the current picture, and decode the current picture according to a reference picture in the reference picture list.

Optionally, in some possible implementations of the present disclosure, the random access segment in which the current picture is located includes pictures that are arranged in a decoding order from a closest random access point before the current picture to a closest random access point after the current picture at a video layer at which the current picture is located, and the random access segment in which the current picture is located includes a picture at the closest random access point before the current picture, but does not include a picture at the closest random access point after the current picture; or if the current picture is located at a dependent layer, the random access segment in which the current picture is located includes pictures that are arranged in a decoding order from a closest random access point before the current picture to a closest random access point after the current picture at a video layer at which the current picture is located, and includes pictures that are arranged in a decoding order from a closest random access point before X reference pictures of the current picture to a closest random access point after the X reference pictures at a video layer at which the X reference pictures are located, the random access segment in which the current picture is located includes a picture at the closest random access point before the current picture, but does not include a picture at the closest random access point after the current picture, the random access segment in which the current picture is located includes a picture at the closest random access point before the X reference pictures, but does not include a picture at the closest random access point after the X reference pictures, and the X reference pictures are reference pictures of the current picture that are at another video layer other than the dependent layer.

It may be understood that functions of function modules of the picture decoding apparatus 700 in this embodiment may be implemented according to the method in the foregoing method embodiment. For a specific implementation process, refer to related descriptions of the foregoing method embodiment. Details are not described herein again.

It may be learned that in a picture decoding process of the picture decoding apparatus 700 in this embodiment, after a current picture is obtained, K reference pictures of the current picture may be selected from a knowledge base, and the current picture is decoded according to the K reference pictures. Because at least one picture in the knowledge base does not belong to a random access segment in which the current picture is located, that is, the at least one picture that does not belong to the random access segment in which the current picture is located may be used as a candidate reference picture of the current picture, a picture that does not belong to the random access segment in which the current picture is located may be selected as a reference picture of the current picture. To some extent, this breaks a limitation that is imposed by a conventional technology on a reference picture candidate range of the current picture, and this further helps improve video decoding efficiency to some extent because the solution expands the reference picture candidate range of the current picture to some extent.

Figure 8:
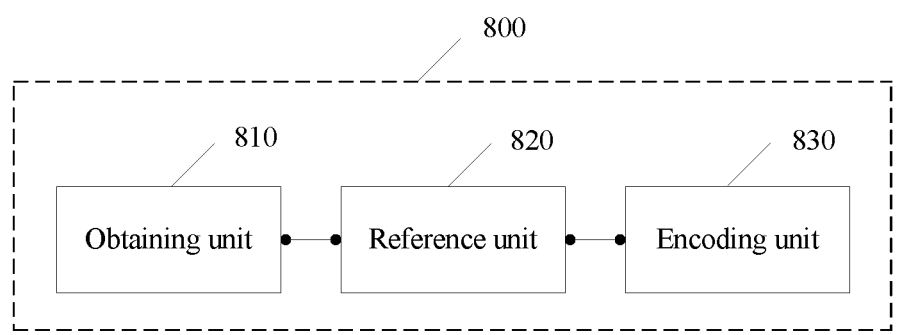
FIG. 8 is a schematic structural diagram of a picture encoding apparatus according to an embodiment of the present disclosure.

Referring to FIG. 8, an embodiment of the present disclosure provides a picture encoding apparatus 800. The picture encoding apparatus 800 may include an obtaining unit 810, a reference unit 820, and an encoding unit 830.

The obtaining unit 810 is configured to obtain a current picture.

The reference unit 820 is configured to select, from a knowledge base, K reference pictures of the current picture, where at least one picture in the knowledge base does not belong to a random access segment in which the current picture is located, and K is an integer greater than or equal to 1.

The encoding unit 830 is configured to encode the current picture according to the K reference pictures.

Optionally, in some possible implementations of the present disclosure, picture features of the K reference pictures match a picture feature of the current picture.

Optionally, in some possible implementations of the present disclosure, the picture feature includes at least one of scale-invariant feature transform SIFT or speeded up robust features SURF.

Optionally, in some possible implementations of the present disclosure, the knowledge base includes a key picture in a video sequence to which the current picture belongs, and the key picture in the video sequence to which the current picture belongs includes at least one of a scene cut picture or a background picture in the video sequence to which the current picture belongs.

Optionally, in some possible implementations of the present disclosure, the scene cut picture is obtained by performing scene cut detection on the video sequence to which the current picture belongs, or the background picture is obtained by performing background modeling on the video sequence to which the current picture belongs.

Optionally, in some possible implementations of the present disclosure, at least one picture in the knowledge base is obtained by decoding a second video bitstream, or at least one picture in the knowledge base is obtained by decoding a first video bitstream obtained by encoding the current picture.

Optionally, in some possible implementations of the present disclosure, the random access segment in which the current picture is located includes pictures that are arranged in a decoding order from a closest random access point before the current picture to a closest random access point after the current picture at a video layer at which the current picture is located, and the random access segment in which the current picture is located includes a picture at the closest random access point before the current picture, but does not include a picture at the closest random access point after the current picture; or if the current picture is located at a dependent layer, the random access segment in which the current picture is located includes pictures that are arranged in a decoding order from a closest random access point before the current picture to a closest random access point after the current picture at a video layer at which the current picture is located, and includes pictures that are arranged in a decoding order from a closest random access point before X reference pictures of the current picture to a closest random access point after the X reference pictures at a video layer at which the X reference pictures are located, the random access segment in which the current picture is located includes a picture at the closest random access point before the current picture, but does not include a picture at the closest random access point after the current picture, the random access segment in which the current picture is located includes a picture at the closest random access point before the X reference pictures, but does not include a picture at the closest random access point after the X reference pictures, and the X reference pictures are reference pictures of the current picture that are at another video layer other than the dependent layer.

It may be understood that functions of function modules of the picture encoding apparatus 800 in this embodiment may be implemented according to the method in the foregoing method embodiment. For a specific implementation process, refer to related descriptions of the foregoing method embodiment. Details are not described herein again.

It may be learned that in a picture encoding process of the picture encoding apparatus 800 in this embodiment, after a current picture is obtained, K reference pictures of the current picture may be selected from a knowledge base, and the current picture is encoded according to the K reference pictures. Because at least one picture in the knowledge base does not belong to a random access segment in which the current picture is located, that is, the at least one picture that does not belong to the random access segment in which the current picture is located may be used as a candidate reference picture of the current picture, a picture that does not belong to the random access segment in which the current picture is located may be selected as a reference picture of the current picture. To some extent, this breaks a limitation that is imposed by a conventional technology on a reference picture candidate range of the current picture, and this further helps improve video coding efficiency to some extent because the solution expands the reference picture candidate range of the current picture to some extent.

Figure 9:
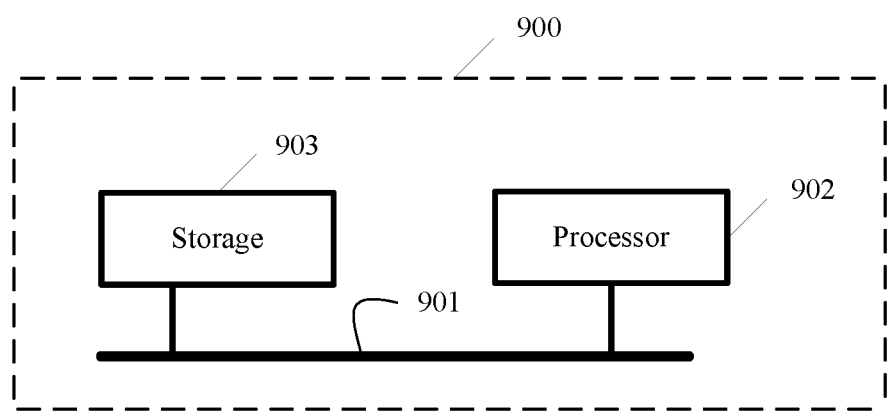
FIG. 9 is a schematic structural diagram of another picture encoding apparatus according to an embodiment of the present disclosure.

Referring to FIG. 9, a picture encoding apparatus 900 provided in an embodiment of the present disclosure may include:

a processor 902 and a storage 903. The processor 902 is coupled and connected to the storage 903 by using a bus 901. The processor 902 invokes code or an instruction in the storage 903, to obtain a current picture; select, from a knowledge base, K reference pictures of the current picture, where at least one picture in the knowledge base does not belong to a random access segment in which the current picture is located, and K is an integer greater than or equal to 1; and encode the current picture according to the K reference pictures.

Optionally, in some possible implementations of the present disclosure, picture features of the K reference pictures match a picture feature of the current picture.

Optionally, in some possible implementations of the present disclosure, the picture feature includes at least one of scale-invariant feature transform (SIFT) or speeded up robust features (SURF).

Optionally, in some possible implementations of the present disclosure, the knowledge base includes a key picture in a video sequence to which the current picture belongs, and the key picture in the video sequence to which the current picture belongs includes at least one of a scene cut picture or a background picture in the video sequence to which the current picture belongs.

Optionally, in some possible implementations of the present disclosure, the scene cut picture is obtained by performing scene cut detection on the video sequence to which the current picture belongs, or the background picture is obtained by performing background modeling on the video sequence to which the current picture belongs.

Optionally, in some possible implementations of the present disclosure, at least one picture in the knowledge base is obtained by decoding a second video bitstream, or at least one picture in the knowledge base is obtained by decoding a first video bitstream obtained by encoding the current picture.

Optionally, in some possible implementations of the present disclosure, the random access segment in which the current picture is located includes pictures that are arranged in a decoding order from a closest random access point before the current picture to a closest random access point after the current picture at a video layer at which the current picture is located, and the random access segment in which the current picture is located includes a picture at the closest random access point before the current picture, but does not include a picture at the closest random access point after the current picture; or if the current picture is located at a dependent layer, the random access segment in which the current picture is located includes pictures that are arranged in a decoding order from a closest random access point before the current picture to a closest random access point after the current picture at a video layer at which the current picture is located, and includes pictures that are arranged in a decoding order from a closest random access point before X reference pictures of the current picture to a closest random access point after the X reference pictures at a video layer at which the X reference pictures are located, the random access segment in which the current picture is located includes a picture at the closest random access point before the current picture, but does not include a picture at the closest random access point after the current picture, the random access segment in which the current picture is located includes a picture at the closest random access point before the X reference pictures, but does not include a picture at the closest random access point after the X reference pictures, and the X reference pictures are reference pictures of the current picture that are at another video layer other than the dependent layer.

It may be understood that functions of function modules of the picture encoding apparatus 900 in this embodiment may be implemented according to the method in the foregoing method embodiment. For a specific implementation process, refer to related descriptions of the foregoing method embodiment. Details are not described herein again.

It may be learned that in a picture encoding process of the picture encoding apparatus 900 in this embodiment, after a current picture is obtained, K reference pictures of the current picture may be selected from a knowledge base, and the current picture is encoded according to the K reference pictures. Because at least one picture in the knowledge base does not belong to a random access segment in which the current picture is located, that is, the at least one picture that does not belong to the random access segment in which the current picture is located may be used as a candidate reference picture of the current picture, a picture that does not belong to the random access segment in which the current picture is located may be selected as a reference picture of the current picture. To some extent, this breaks a limitation that is imposed by a conventional technology on a reference picture candidate range of the current picture, and this further helps improve video coding efficiency to some extent because the solution expands the reference picture candidate range of the current picture to some extent.

It should be noted that, to make the description brief, the foregoing method embodiments are expressed as a series of actions. However, persons skilled in the art should appreciate that the present disclosure is not limited to the described action sequence, because according to the present disclosure, some steps may be performed in other sequences or performed simultaneously. In addition, persons skilled in the art should also appreciate that all the embodiments described in the specification are example embodiments, and the related actions and modules are not necessarily mandatory to the present disclosure.

In the foregoing embodiments, the description of each embodiment has respective focuses. For a part that is not described in detail in an embodiment, reference may be made to related descriptions in other embodiments.

In the several embodiments provided in this application, it should be understood that the disclosed apparatus may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store program code, such as a USB flash drive, a read-only memory (ROM), a random access memory (RAM), a removable hard disk, a magnetic disk, or an optical disc.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A picture decoding method, comprising:
   selecting, from a knowledge base, K reference pictures of a current picture, wherein at least one reference picture in the knowledge base does not belong to a random access segment in which the current picture is located and wherein K is an integer greater than or equal to 1, wherein the current picture belongs to a first video bitstream and the at least one reference picture in the knowledge base is obtained by decoding a second video bitstream from which any decoded picture is only in intra decoding mode, wherein the random access segment is a picture sequence arranged in a decoding order from a closest random access point before the current picture to a closest random access point after the current picture; and
   decoding the current picture according to the K reference pictures.

2. The method according to claim 1, wherein the selecting, from a knowledge base, K reference pictures of the current picture comprises: selecting, from the knowledge base, the K reference pictures of the current picture based on a reference picture index of the current picture, wherein the reference picture index is obtained by decoding a first video bitstream to which the current picture belongs.

3. The method according to claim 2, wherein
   a reference picture that matches the reference picture index is a reconstructed picture located before the random access segment in which the current picture is located.

4. The method according to claim 2, wherein the method further comprises:
   requesting, from a server, an incremental bitstream of the second video bitstream including a reference picture that matches the reference picture index if a reference picture matching the reference picture index cannot be found from the second video bitstream,
   decoding the incremental bitstream of the second video bitstream to obtain the reference picture that matches the reference picture index, and
   using, as a reference picture of the current picture, the obtained reference picture that matches the reference picture index.

5. The method according to claim 2, wherein the reference picture index of the current picture indicates at least one of a number of a reference picture, a picture feature of a reference picture, or a picture feature of the current picture.

6. The method according to claim 5, wherein if the reference picture index indicates the picture feature of the current picture, then picture features of the K reference pictures match the picture feature of the current picture.

7. The method according to claim 5, wherein the picture feature comprises at least one of scale-invariant feature transform (SIFT) or speeded up robust features (SURF).

8. The method according to claim 1, wherein the knowledge base comprises a key picture in a video sequence to which the current picture belongs, and the key picture in the video sequence to which the current picture belongs comprises at least one of a scene cut picture or a background picture in the video sequence to which the current picture belongs.

9. The method according to claim 8, wherein the scene cut picture is obtained by decoding the second video bitstream or the first video bitstream to which the current picture belongs, or the background picture is obtained by decoding the second video bitstream or the first video bitstream to which the current picture belongs, or the background picture is obtained by performing background modeling on a decoded video sequence in the first video bitstream to which the current picture belongs.

10. The method according to claim 1, wherein the decoding the current picture according to the K reference pictures comprises adding the K reference pictures to a reference picture list of the current picture and decoding the current picture according to a reference picture in the reference picture list.

11. The method according to claim 1, wherein:
    the random access segment in which the current picture is located comprises pictures that are arranged in a decoding order from a closest random access point before the current picture to a closest random access point after the current picture at a video layer at which the current picture is located, and the random access segment in which the current picture is located comprises a picture at the closest random access point before the current picture, but does not comprise a picture at the closest random access point after the current picture; or if the current picture is located at a dependent layer, the random access segment in which the current picture is located comprises pictures that are arranged in a decoding order from a closest random access point before the current picture to a closest random access point after the current picture at a video layer at which the current picture is located, and comprises pictures that are arranged in a decoding order from a closest random access point before X reference pictures of the current picture to a closest random access point after the X reference pictures at a video layer at which the X reference pictures are located, the random access segment in which the current picture is located comprises a picture at the closest random access point before the current picture, but does not comprise a picture at the closest random access point after the current picture, the random access segment in which the current picture is located comprises a picture at the closest random access point before the X reference pictures, but does not comprise a picture at the closest random access point after the X reference pictures, and the X reference pictures are reference pictures of the current picture that are at another video layer other than the dependent layer.

12. A picture encoding method, comprising:
selecting, from a knowledge base, K reference pictures of a current picture, wherein at least one reference picture in the knowledge base does not belong to a random access segment in which the current picture is located, and wherein K is an integer greater than or equal to L wherein the random access segment is a picture sequence arranged in a decoding order from a closest random access point before the current picture to a closest random access point after the current picture;
encoding the current picture into a first video bitstream according to the K reference pictures; and
encoding the at least one reference picture into a second video bitstream in which all the pictures represented are coded only in intra coding mode.

13. The method according to claim 12, wherein picture features of the K reference pictures match a picture feature of the current picture.

14. The method according to claim 13, wherein the picture feature comprises at least one of scale-invariant feature transform (SIFT) or speeded up robust features (SURF).

15. The method according to claim 12, wherein the knowledge base comprises a key picture in a video sequence to which the current picture belongs, and the key picture in the video sequence to which the current picture belongs comprises at least one of a scene cut picture or a background picture in the video sequence to which the current picture belongs.

16. The method according to claim 15, wherein the scene cut picture is obtained by performing scene cut detection on the video sequence to which the current picture belongs, or the background picture is obtained by performing background modeling on the video sequence to which the current picture belongs.

17. The method according to claim 12, wherein at least one picture in the knowledge base is obtained by decoding a second video bitstream, or the at least one picture in the knowledge base is obtained by decoding a first video bitstream obtained by encoding the current picture.

18. The method according to claim 12, wherein:
the random access segment in which the current picture is located comprises pictures that are arranged in a decoding order from the closest random access point before the current picture to the closest random access point after the current picture at a video layer at which the current picture is located, and the random access segment in which the current picture is located comprises a picture at the closest random access point before the current picture, but does not comprise a picture at the closest random access point after the current picture; or
if the current picture is located at a dependent layer, the random access segment in which the current picture is located comprises pictures that are arranged in a decoding order from the closest random access point before the current picture to the closest random access point after the current picture at a video layer at which the current picture is located, and comprises pictures that are arranged in a decoding order from a closest random access point before X reference pictures of the current picture to a closest random access point after the X reference pictures at a video layer at which the X reference pictures are located, the random access segment in which the current picture is located comprises a picture at the closest random access point before the current picture, but does not comprise a picture at the closest random access point after the current picture, the random access segment in which the current picture is located comprises a picture at the closest random access point before the X reference pictures, but does not comprise a picture at the closest random access point after the X reference pictures, and the X reference pictures are reference pictures of the current picture that are at another video layer other than the dependent layer.

19. A picture decoding apparatus, comprising:
a memory storage comprising instructions; and
a processor coupled to the storage, wherein the processor executes the instructions to:
select, from a knowledge base, K reference pictures of a current picture, wherein at least one reference picture in the knowledge base does not belong to a random access segment in which the current picture is located and wherein K is an integer greater than or equal to 1, wherein the current picture belongs to a first video bitstream and the at least one reference picture in the knowledge base is obtained by decoding a second video bitstream from which any decoded picture is only in intra decoding mode, wherein the random access segment is a picture sequence arranged in a decoding order from a closest random access point before the current picture to a closest random access point after the current picture; and
decode the current picture according to the K reference pictures.

20. The apparatus according to claim 19, wherein the processor further executes the instructions to select, from the knowledge base, the K reference pictures of the current picture based on a reference picture index of the current picture, wherein the reference picture index is obtained by decoding a first video bitstream to which the current picture belongs.

21. The apparatus according to claim 20, wherein a reference picture that matches the reference picture index is a reconstructed picture located before the random access segment in which the current picture is located.

22. The apparatus according to claim 20, wherein the processor further executes the instructions to:
request, from a server, an incremental bitstream of the second video bitstream including a reference picture that matches the reference picture index if a reference picture matching the reference picture index cannot be found form the second video bitstream;

decode the incremental bitstream of the second video bitstream to obtain the reference picture that matches the reference picture index; and use, as a reference picture of the current picture, the obtained reference picture that matches the reference picture index.

23. The apparatus according to claim 20, wherein the reference picture index of the current picture indicates at least one of a number of a reference picture, a picture feature of a reference picture, or a picture feature of the current picture.

24. The apparatus according to claim 23, wherein if the reference picture index indicates the picture feature of the current picture, then picture features of the K reference pictures match the picture feature of the current picture.

25. The apparatus according to claim 23, wherein the picture feature comprises at least one of scale-invariant feature transform (SIFT) or speeded up robust features (SURF).

26. The apparatus according to claim 19, wherein the knowledge base comprises a key picture in a video sequence to which the current picture belongs, and the key picture in the video sequence to which the current picture belongs comprises at least one of a scene cut picture or a background picture in the video sequence to which the current picture belongs.

27. The apparatus according to claim 26, wherein the scene cut picture is obtained by decoding the second video bitstream or the first video bitstream to which the current picture belongs, or the background picture is obtained by decoding the second video bitstream or the first video bitstream to which the current picture belongs, or the background picture is obtained by performing background modeling on a decoded video sequence in the first video bitstream to which the current picture belongs.

28. The apparatus according to claim 19, wherein the processor further executes the instructions to add the K reference pictures to a reference picture list of the current picture and to decode the current picture according to a reference picture in the reference picture list.

29. The apparatus according to claim 19, wherein:
the random access segment in which the current picture is located comprises pictures that are arranged in a decoding order from a closest random access point before the current picture to a closest random access point after the current picture at a video layer at which the current picture is located, and the random access segment in which the current picture is located comprises a picture at the closest random access point before the current picture, but does not comprise a picture at the closest random access point after the current picture; or
if the current picture is located at a dependent layer, the random access segment in which the current picture is located comprises pictures that are arranged in a decoding order from a closest random access point before the current picture to a closest random access point after the current picture at a video layer at which the current picture is located, and comprises pictures that are arranged in a decoding order from a closest random access point before X reference pictures of the current picture to a closest random access point after the X reference pictures at a video layer at which the X reference pictures are located, the random access segment in which the current picture is located comprises a picture at the closest random access point before the current picture, but does not comprise a picture at the closest random access point after the current picture, the random access segment in which the current picture is located comprises a picture at the closest random access point before the X reference pictures, but does not comprise a picture at the closest random access point after the X reference pictures, and the X reference pictures are reference pictures of the current picture that are at another video layer other than the dependent layer.

30. A picture encoding apparatus, comprising:
a memory storage comprising instructions; and
a processor coupled to the memory storage, wherein the processor is configured to:
select, from a knowledge base, K reference pictures of a current picture, wherein at least one reference picture in the knowledge base does not belong to a random access segment in which the current picture is located, and wherein K is an integer greater than or equal to 1, wherein the random access segment is a picture sequence arranged in a decoding order from a closest random access point before the current picture to a closest random access point after the current picture;
encode the current picture into a first video bitstream, according to the K reference pictures; and
encode the at least one reference picture into a second video bitstream in which all the pictures represented are coded only in intra coding mode.

31. The apparatus according to claim 30, wherein picture features of the K reference pictures match a picture feature of the current picture.

32. The apparatus according to claim 31, wherein the picture feature comprises at least one of scale-invariant feature transform (SIFT) or speeded up robust features (SURF).

33. The apparatus according to claim 30, wherein the knowledge base comprises a key picture in a video sequence to which the current picture belongs, and the key picture in the video sequence to which the current picture belongs comprises at least one of a scene cut picture or a background picture in the video sequence to which the current picture belongs.

34. The apparatus according to claim 33, wherein the scene cut picture is obtained by performing scene cut detection on the video sequence to which the current picture belongs, or the background picture is obtained by performing background modeling on the video sequence to which the current picture belongs.

35. The apparatus according to claim 30, wherein at least one picture in the knowledge base is obtained by decoding a second video bitstream, or the at least one picture in the knowledge base is obtained by decoding a first video bitstream obtained by encoding the current picture.

36. The apparatus according to claim 30, wherein:
the random access segment in which the current picture is located comprises pictures that are arranged in a decoding order from the closest random access point before the current picture to the closest random access point after the current picture at a video layer at which the current picture is located, and the random access segment in which the current picture is located comprises a picture at the closest random access point before the current picture, but does not comprise a picture at the closest random access point after the current picture; or
if the current picture is located at a dependent layer, the random access segment in which the current picture is located comprises pictures that are arranged in a decoding order from the closest random access point before the current picture to the closest random access point after the current picture at a video layer at which the current picture is located, and comprises pictures that are arranged in a decoding order from a closest random access point before X reference pictures of the current picture to a closest random access point after the X reference pictures at a video layer at which the X reference pictures are located, the random access segment in which the current picture is located comprises a picture at the closest random access point before the current picture, but does not comprise a picture at the closest random access point after the current picture, the random access segment in which the current picture is located comprises a picture at the closest random access point before the X reference pictures, but does not comprise a picture at the closest random access point after the X reference pictures, and the X reference pictures are reference pictures of the current picture that are at another video layer other than the dependent layer.

\* \* \* \* \*

UNITED STATES PATENT AND TRADEMARK OFFICE
CERTIFICATE OF CORRECTION

PATENT NO. : 10,917,638 B2
APPLICATION NO. : 15/711555
DATED : February 9, 2021
INVENTOR(S) : Yu et al.

Page 1 of 1

It is certified that error appears in the above-identified patent and that said Letters Patent is hereby corrected as shown below:

On the Title Page

Item (71), "Applicant", Column 1, Line 2: replace "Guangdong (CN)" with --Shenzhen, Guangdong (CN)--
Page 2, item (56), "Other Publications", Column 2, Line 29: replace "Conding" with --coding--

In the Specification

Column 10, Line 34: replace ", for" with --For--
Column 14, Line 55: replace ", for" with --For--
Column 18, Line 14: replace ", for" with --For--

In the Claims

Claim 22, Column 37, Line 2: replace "found form the" with --found from the--

Signed and Sealed this
Twenty-fifth Day of October, 2022

Katherine Kelly Vidal
*Director of the United States Patent and Trademark Office*